(12) United States Patent
Lieberman

(10) Patent No.: US 9,615,223 B2
(45) Date of Patent: *Apr. 4, 2017

(54) ELECTRONIC MESSAGING TECHNOLOGY

(71) Applicant: ALWAYSON, LLC, New York, NY (US)

(72) Inventor: Jonathan Lieberman, New York, NY (US)

(73) Assignee: AlwaysOn, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/596,749

(22) Filed: Jan. 14, 2015

(65) Prior Publication Data

US 2015/0195688 A1 Jul. 9, 2015

Related U.S. Application Data

(63) Continuation of application No. 12/968,138, filed on Dec. 14, 2010, now Pat. No. 8,953,571.

(60) Provisional application No. 61/286,135, filed on Dec. 14, 2009.

(51) Int. Cl.
 *H04W 4/00* (2009.01)
 *H04W 4/12* (2009.01)
 *H04L 12/58* (2006.01)

(52) U.S. Cl.
 CPC ........... *H04W 4/12* (2013.01); *H04L 12/5895* (2013.01); *H04L 51/38* (2013.01); *H04L 12/589* (2013.01)

(58) Field of Classification Search
 CPC ... H04L 51/38; H04L 12/589; H04L 12/5895; H04W 4/12
 See application file for complete search history.

(56) References Cited

U.S. PATENT DOCUMENTS

| | | |
|---|---|---|
| 7,369,865 B2 | 5/2008 | Gabriel et al. |
| 2002/0131444 A1 | 9/2002 | Moodie et al. |
| 2005/0273489 A1 | 12/2005 | Pecht et al. |
| 2006/0045124 A1 | 3/2006 | Dahlstrom et al. |
| 2008/0013701 A1* | 1/2008 | Barhydt ................ H04L 12/588 379/92.02 |
| 2008/0040437 A1 | 2/2008 | Agarwal et al. |
| 2008/0045236 A1* | 2/2008 | Nahon ................... H04W 4/12 455/456.1 |
| 2008/0175235 A1 | 7/2008 | Frifeldt et al. |
| 2009/0106416 A1 | 4/2009 | Cohen et al. |
| 2009/0264140 A1 | 10/2009 | Bain |
| 2011/0029923 A1 | 2/2011 | Xu et al. |
| 2012/0028623 A1* | 2/2012 | Verdon ................. G06Q 30/02 455/418 |
| 2012/0079107 A1 | 3/2012 | Williams et al. |

OTHER PUBLICATIONS

International Search Report dated Aug. 30, 2011 in International Application No. PCT/US2010/060352.
Written Opinion of the International Search Authority dated Aug. 30, 2011 in International Application No. PCT/US2010/060352.

* cited by examiner

*Primary Examiner* — Kan Yuen
(74) *Attorney, Agent, or Firm* — Venable LLP

(57) ABSTRACT

Techniques are described for capturing text (e.g., SMS) messages and multimedia (e.g. MMS) messages along with messages and data sent with other communication modalities. The captured information may be used for performing social networking-related, data processing and auditing operations in real-time.

15 Claims, 19 Drawing Sheets

ELECTRONIC MESSAGING TECHNOLOGY

CROSS REFERENCE TO RELATED APPLICATIONS

This application is a continuation of prior U.S. application Ser. No. 12/968,138, filed Dec. 14, 2010, which claims the benefit of U.S. Provisional Application No. 61/286,135, filed Dec. 14, 2009. U.S. application Ser. No. 12/968,138 and U.S. Provisional Application No. 61/286,135 are incorporated herein by reference in their entirety for all purposes.

TECHNICAL FIELD

This disclosure relates to electronic messaging and communication technology.

BACKGROUND

SMS (short message service) comprises a method of sending messages to users of mobile devices and other computer devices supporting the protocol. In order to achieve interoperability between wireless carriers, SMS is sent via a well-defined, standards-based protocol. This protocol is comprised of multiple predefined parameters, each with a predefined octet length for its relevant data. SMS are sent through SMS centers where they are stored before being forwarded to their ultimate destination.

MMS (multimedia message service) comprises a method of sending messages much larger than SMS which include encoded attachments such as image, video and audio among others. MMS also uses a well-defined standards-based protocol. MMS are sent from mobile devices to a store and forward server which then uses SMS to notify handsets of waiting attachments which are stored separately and retrieved via Hypertext Transfer Protocol (HTTP).

SUMMARY

Techniques are described for electronic messaging and communication technology.

In one aspect, a system includes a mobile device application that operates on a mobile device of a user. The mobile device application is configured to obtain a message sent or received by the mobile device over a mobile device communication protocol and is configured to forward the obtained message over a network connection that does not use the mobile device communication protocol. The network connection is different than a traditional wireless signaling or delivery channel over which the message was sent or received. The system also includes a server system that is remote for the mobile device. The server system is configured to receive, from the mobile device application over the network connection, the obtained message, is configured to log, in electronic storage, the obtained message, and is configured to make the logged message available to the user over the network connection using the mobile device or another device.

Implementations may include one or more of the following features. For example, the mobile device application may be configured to obtain a message sent by the mobile device over the mobile device communication protocol and may be configured to forward the sent message over the network connection that does not use the mobile device communication protocol. In this example, the server system may be configured to receive, from the mobile device application over the network connection, the sent message, may be configured to log, in electronic storage, the sent message, and may be configured to make the sent message available to the user over the network connection using the mobile device or another device.

In some implementations, the mobile device application may be configured to obtain a message received by the mobile device over the mobile device communication protocol and may be configured to forward the received message over the network connection that does not use the mobile device communication protocol. In these implementations, the server system may be configured to receive, from the mobile device application over the network connection, the received message, may be configured to log, in electronic storage, the received message, and may be configured to make the received message available to the user over the network connection using the mobile device or another device.

In some examples, the mobile device application may be configured to obtain a Short Message Service (SMS) message sent by the mobile device over an SMS transport protocol and may be configured to forward the SMS message via Hypertext Transfer Protocol (HTTP) over Transmission Control Protocol and Internet Protocol (TCP/IP). In these examples, the server system may be configured to receive, from the mobile device application via HTTP over TCP/IP, the SMS message, may be configured to log, in electronic storage, the SMS message, and may be configured to make the SMS message available to the user via HTTP over TCP/IP.

In addition, the mobile device application may be configured to obtain an SMS message received by the mobile device over an SMS transport protocol and may be configured to forward the SMS message via HTTP over TCP/IP. The server system may be configured to receive, from the mobile device application via HTTP over TCP/IP, the SMS message, may be configured to log, in electronic storage, the SMS message, and may be configured to make the SMS message available to the user via HTTP over TCP/IP.

Further, the mobile device application may be configured to obtain a Multimedia Messaging Service (MMS) message sent by the mobile device over an MMS protocol and may be configured to forward the MMS message via HTTP over TCP/IP. The server system may be configured to receive, from the mobile device application via HTTP over TCP/IP, the MMS message, may be configured to log, in electronic storage, the MMS message, and may be configured to make the MMS message available to the user via HTTP over TCP/IP.

In some implementations, the mobile device application may be configured to obtain an MMS message received by the mobile device over an MMS protocol and may be configured to forward the MMS message via HTTP over TCP/IP. In these implementations, the server system may be configured to receive, from the mobile device application via HTTP over TCP/IP, the MMS message, may be configured to log, in electronic storage, the MMS message, and may be configured to make the MMS message available to the user via HTTP over TCP/IP.

In some examples, the mobile device application may be configured to obtain an MMS message sent or received by the mobile device over an MMS protocol and send, over the network connection to the server system, a first message that indicates an un-encoded MMS message of a particular size is available. In these examples, the server system may be configured to receive, over the network connection from the mobile device application, the first message, assign a message identifier to the un-encoded MMS message, and send, over the network connection to the mobile device application, an acknowledgement message that acknowledges receipt of the first message and includes the message identifier. Further, in these examples, the mobile device application may be configured to assign the message identifier to a queue, track offset status for the un-encoded MMS message in association with the message identifier, and send, over the network connection to the server system, chunks of the un-encoded MMS message each in association with the message identifier and a byte offset. The byte offset may indicate which portion of the un-encoded MMS message is included in the associated chunk. The server system may be configured to receive, over the network connection from the mobile device application, the chunks of the un-encoded MMS message, determine when all of the chunks of the un-encoded MMS message have been received, reassemble the un-encoded MMS message based on byte offset information associated with the chunks, encode the reassembled un-encoded MMS message, and store, in electronic storage, the encoded MMS message.

The mobile device application may be configured to access, from the mobile device, contact and contextual data relevant to the obtained message and forward, over the network connection to the server system, the accessed contact and contextual data with the obtained message. The server system may be configured to develop or evaluate and modify a contact list for the user by iteratively gathering contact data for contacts with which the user exchanges communications and aggregating the contact data into a contact list for the user based on actual interactions of the user and the contacts.

In some examples, the server system may be configured to trigger operations related to deriving social network connections for the user based on receiving the obtained message and may be configured to, in response to triggering the operations related to deriving social network connections, derive, in real-time and without user intervention, one or more social network connections for the user based on the obtained message and other messages that have been forwarded to the server system and that are associated with the user. In these examples, the server system may be configured to interrogate the mobile device application for additional information relevant to social network connections for the user, receive the additional information from the mobile device application, and use the additional information in deriving social network connections for the user. Further, in these examples, the server system may be configured to notify the user of at least one new social network connection, event, or relationship derived, in real-time and without user intervention, based on the obtained message and other messages that have been forwarded to the server system and that are associated with the user.

In addition, the server system may be configured to receive, in addition to the obtained message and over communication modalities that are different than a communication modality over which the obtained message was exchanged between the user and another user, messages exchanged between the user and the other user and thread, into a single conversation thread, the obtained message with the messages exchanged between the user and the other user over the communication modalities that are different than the communication modality over which the obtained message was exchanged. The server system also may be configured to audit the obtained message and other messages communicated by the user for compliance with one or more rules of a government or regulatory organization that govern communications engaged in by the user with the mobile device, parental control and monitoring or other activity and content approval.

Further, the server system may be configured to construct a social network based on aggregated data received from mobile devices by performing contact data analysis on contact data aggregated by the server system, performing message content and context analysis on message and context data aggregated by the server system, performing metadata and other user or device content analysis on metadata and other user or device content aggregated by the server system, and performing relationship and network building based on the contact data analysis, the message content and context analysis, and the metadata and other user or device content analysis. The server system may be configured to perform semantic advertisement service based on the obtained message and other mobile messaging content.

In some implementations, the mobile device application may be configured to send, over the network connection to the server system, a first message that indicates un-encoded data of a particular size is available. In these implementations, the server system may be configured to receive, over the network connection from the mobile device application, the first message, assign a data identifier to the un-encoded data, and send, over the network connection to the mobile device application, an acknowledgement message that acknowledges receipt of the first message and includes the data identifier. Also, in these implementations, the mobile device application may be configured to assign the data identifier to a queue, track offset status for the un-encoded data in association with the data identifier, and send, over the network connection to the server system, chunks of the un-encoded data each in association with the data identifier and a byte offset. The byte offset may indicate which portion of the un-encoded data is included in the associated chunk. Further, in these implementations, the server system may be configured to receive, over the network connection from the mobile device application, the chunks of the un-encoded data, determine when all of the chunks of the un-encoded data have been received, reassemble the un-encoded data based on byte offset information associated with the chunks, encode the reassembled un-encoded data, and store, in electronic storage, the encoded data.

In another aspect, a mobile device application operates on a mobile device of a user based on instructions stored, in a computer-readable storage medium of the mobile device. The mobile device application is configured to perform operations that include obtaining a message sent or received by the mobile device over a mobile device communication protocol. The operations also include forwarding the obtained message over a network connection that does not use the mobile device communication protocol. The network connection is different than a traditional wireless signaling or delivery channel over which the message was sent or received and the forwarded message is received by a server system that is remote for the mobile device. The server system is configured to receive, from the mobile device application over the network connection, the obtained message, is configured to log, in electronic storage, the obtained message, and is configured to make the logged message available to the user over the network connection using the mobile device or another device.

In yet another aspect, a server system includes at least one processor and at least one memory coupled to the at least one processor having stored thereon instructions which, when executed by the at least one processor, causes the at least one processor to perform operations. The operations include receiving, over a network connection from a mobile device application that operates on a mobile device of a user, a message obtained by the mobile device application. The obtained message had been sent or received by the mobile device over a mobile device communication protocol and had been forwarded by the mobile device application over a network connection that does not use the mobile device communication protocol. The network connection is different than a traditional wireless signaling or delivery channel over which the message was sent or received. The operations also include logging, in electronic storage, the received message and making the logged message available to the user over the network connection using the mobile device or another device.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for capturing text (e.g., SMS) and multimedia (e.g. MMS) messages along with messages sent with other communication modalities, contacts, location, and metadata. The captured message information may be used for performing social networking-related operations as well as user and device monitoring. In the below detailed description, the various sections describe aspects of an electronic messaging and communication system that captures message information and uses the captured message information for performing social networking-related operations. In some implementations, the electronic messaging and communication system may include all of the aspects described in the below sections and may provide all of the features described below in a single system. In other implementations, the electronic messaging and communication system may include any combination of one or more of the aspects described in the below sections and may provide any combination of one or more of the features described below.

Section 1—Method and System for "Out-of-Band" Delivery, Persistent Storage, and Data Manipulation of SMS and MMS.

Figure 1A:
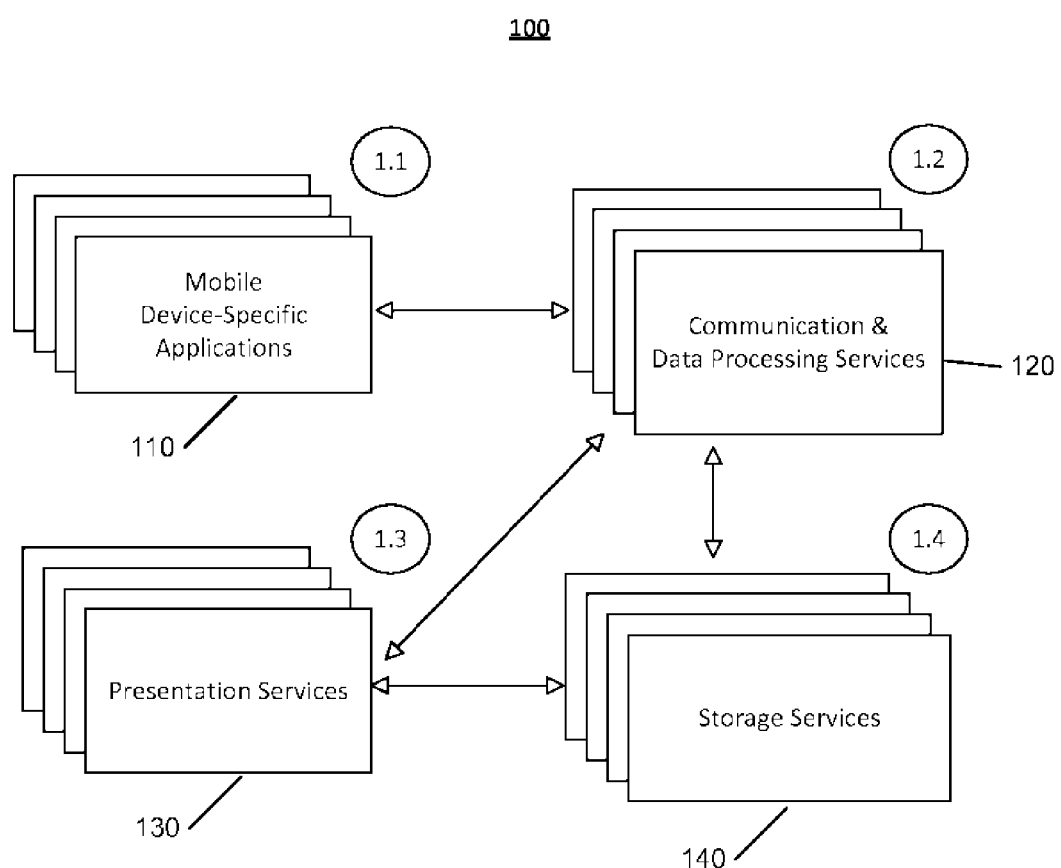
FIG. 1A is a block diagram of an example system.

The disclosed system delivers incoming and outgoing SMS and MMS to a designated server over any available network connections without utilizing the SMS or MMS protocol or infrastructure. The disclosed implementations comprise four general areas: (1) Mobile device-specific applications, (2) Communication and data processing services, (3) Presentation services, and (4) Storage solutions. FIG. 1A illustrates an example system 100 with these components, which are elaborated upon in further sections. The system 100 includes mobile device-specific applications) 10, communication and data processing services 120, presentation services 130, and storage services 140.

(1) Mobile Device-Specific Applications

Mobile device applications 110 comprise a group of applications that run on the mobile device. Upon the device receiving an SMS or MMS, the mobile device applications 110 deliver the message and relevant metadata to a central processing server where it is encoded and stored. The system 100 may include any number of one or more mobile device applications 110.

The mobile device applications 110 also query the mobile device for more data relevant to the SMS/MMS. If found, the mobile device applications 110 may forward, to the central processing server, the additional data relevant to the SMS/MMS, as related data associated with the forwarded message. The additional data relevant to the SMS/MMS may include a standards-based contact entry in an address book (such as V-Card) for the sender or recipient of the message as well as calendar, photos, video, and other files and media which the application derives is associated with the sender or recipient. The mobile device application may also bulk upload contact information in order to facilitate communication and data processing services.

(2) Communication and Data Processing Services

Communication and processing services 120 comprise a group of services that communicate with the mobile devices and process the data they forward. These processes also include logic and services which intuit social connections based on the contact data that is sent, contextual processing of the content of the messages, and ad serving technologies that utilize behavioral data derived from the former and other parts of the system. The system 100 may include any number of one or more communication and processing services 120. The system 100 may include processing services 120 in the form of application programming interfaces to facilitate third-party interaction with the processes. The services may be centralized or distributed.

The communication and processing services 120 also include network management and connection processes which permit users of the system to maintain connections to multiple third-party internal or third-party messaging and social networks.

The communication and processing services 120 also organize (e.g., thread) conversations for users and provide auditing facilities to track and react to this communication. The data can then be used by third-party systems or by the presentation services 130, as discussed below.

(3) Presentation Services

Presentation services 130 comprise a group of server-side and client-side services which manage presentation of user data. Server-side components may be centralized or distributed. Users who access the system 100 via the Internet using a web browser maintain constant communication with the presentation services 130. These presentation services 130, in turn, provide the user with access to data sent and received from their mobile devices, storage of the same and other assets, and visibility into their network as it builds in real time, notifications and other data and event driven events. The system 100 may include any number of one or more presentation services 130.

The presentation services 130 also present users with an address book derived from their actual SMS and MMS correspondence with users—in other words, their own social network as derived from their explicit actions (or those explicit actions of their peers) and the associated contact and meta data as derived by the system 100 in real time. The system 100 derives social networks for users based on their actual communications and actions without any input being required by the users. In this regard, the system 100 derives a dynamic social network for a user in real time that reflects the actual messages, communications, and other actions performed by the user without requiring the user to provide information identifying which other users should be included in the user's social network.

(4) Storage Services

Storage services 140 comprise a group of processing and data base storage solutions which manage message, content, context and contact data derived through use of the system. The system 100 may include any number of one or more storage services 140. The storage services 140 may include processing services in the form of application programming interfaces to facilitate third-party interaction with system 100. Storage services may be centralized or distributed.

Storage services 140 manage encoding and processing of messages and their attachments and their safe storage for later access by system 100 users. They also log all messages which are sent and received by use of the system 100 through a web browser—use of which may involve communication and messaging with a number of messaging and social networks. This data is likewise managed and stored by the storage services 140.

These storage services 140 also manage users' contacts and social networks as they are built and provide access to same by Communication and data processing services 120, Presentation services 130 as well as via application programming interfaces.

These storage services 140 further manage context (e.g., through processing of message payloads) and other metadata useful for targeting and profiling of users. The context and other metadata may be used to create a profile for a user that reflects the actual messages, communications, and other actions performed by the user over multiple, different communication modalities.

Figure 1B:
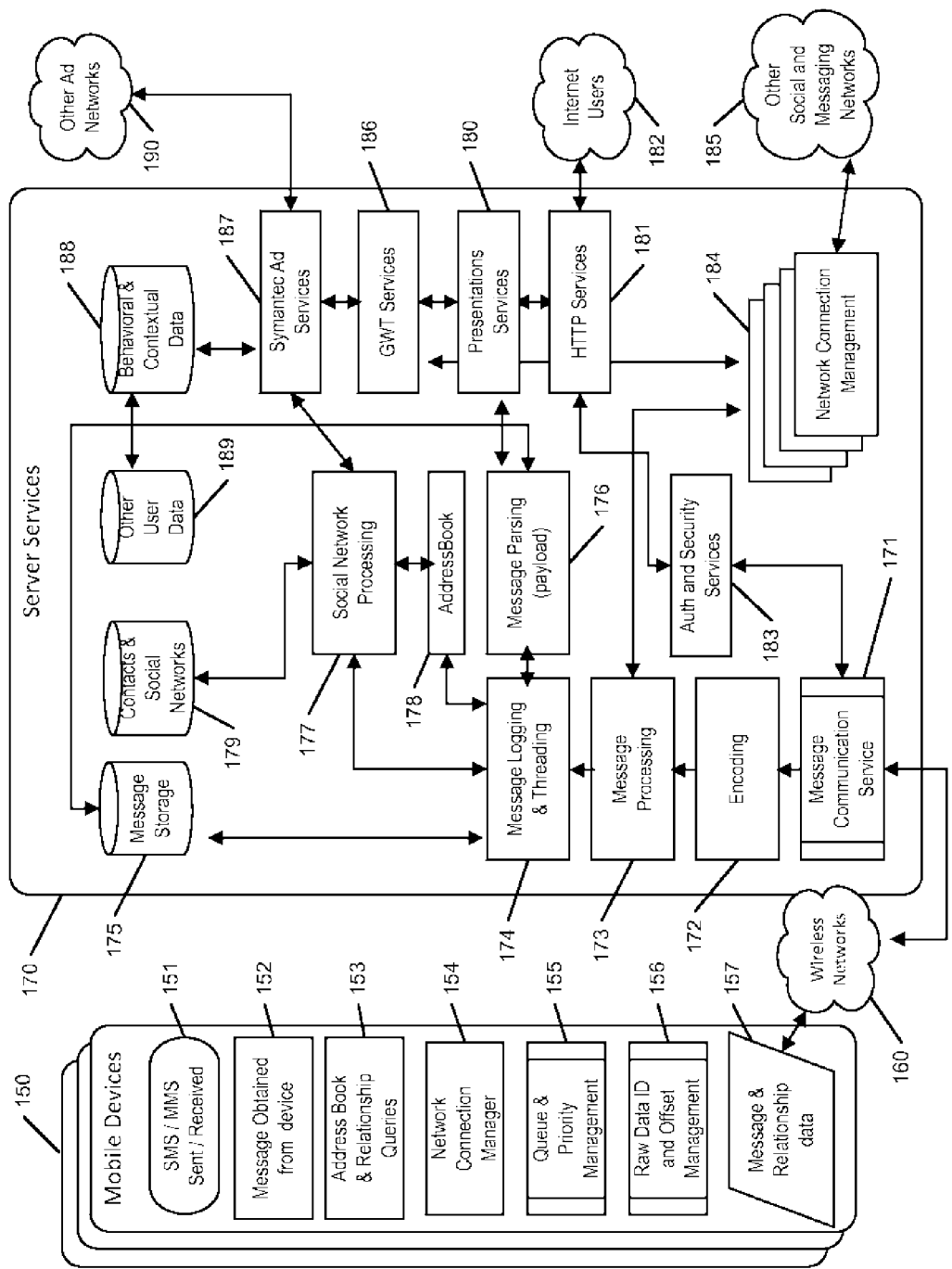
FIG. 1B is a block diagram of an example system that illustrates details of the components included in the system shown in FIG. 1A.

FIG. 1B illustrates an example system that illustrates details of the components included in the system 100 shown in FIG. 1A. Additional operations of the components shown in FIG. 1B are described throughout this disclosure.

As shown in FIG. 1B, the system includes one or many mobile devices 150 and server services 170 that are operated on one or more server systems. The mobile device-specific applications 110 discussed above with respect to FIG. 1A may be operated on the mobile devices 150 and the server services 170 may include the communication and data processing services 120, presentation services 130, and storage services 140 discussed above with respect to FIG. 1A.

The mobile devices 150 may include an application 151 that sends and receives SMS/MMS messages or other message types. The mobile devices 150 also may include an application 152 that obtains sent/received messages from the device and an application 153 that performs address book and relationship queries. The mobile devices 150 further may include a network connection manager application 154, a queue and priority management application 155, and a raw data identification and offset management application 156 and error-correction management. The mobile devices 150 use the applications 152, 153, 154, 155, and 156 to send message and relationship data 157 regarding exchanged SMS/MMS messages to the server services 170 over a network 160 (e.g., one or more wireless networks). The network 160 may be a different communication medium than the communication medium over which the actual SMS/MMS messages are exchanged.

The server services 170 may include a message communication service 171 that receives the message and relationship data 157. An encoding service 172 encodes the message data and a message processing service 173 that processes the encoded message data. A message logging and threading service 174 performs message logging and threading operations and stores data in message storage 175. A message parsing service 176 receives message data from the message logging and threading service 174, parses the payload from the message data, and stores the parsed payload in the message storage 175. A social network processing service 177 analyzes message and contact data to derive social network connections and relationships, as described throughout this disclosure. The derived social network connections and relationships are stored in contacts and social networks storage 179. An address book service 178 performs contact handling operations and communicates with the social network processing service 177 to inform social network derivation and application programming interfaces facilitating internal or external systems interaction with data.

Presentations services 180 control presentation of data to Internet users 182 via HTTP services 181. Authentication and security services 183 control user access to the system and control whether remote users can view and/or send message data using the system. Network connection management service 184 manages network connections with other social and messaging networks to allow a user to be persistently logged on to the other social and messaging networks 185 through the system and to capture user interactions from the other social and messaging networks 185. Presentations services 180 also communicate with GWT and presentation and interaction-facilitating services 186 to inform symantec advertising services 187. The symantec advertising services 187 perform symantec advertising operations described throughout this disclosure based on data from the GWT and presentation and interaction-facilitating services 186 and behavioral and contextual data stored in the behavioral and contextual data storage 188. Other user data stored in other user data storage 189 also may be used by the Symantec advertising services 187. The Symantec advertising services 187 communicate with other advertising networks 190 to present relevant advertisements to users and/or to gain additional information to better select advertisements for users.

Section 2—Method and System for 'Out-of-Band' Message Management and Storage

Techniques are described for delivery of SMS and MMS to one or more service servers for processing and persistent storage of messages. These servers may be centralized or distributed. Centralization of any one component-set, such as a front-end, does not preclude distribution of other services.

Delivery of messages may be accomplished in real-time. For instance, once a message is received on the mobile device, it is immediately delivered on to the service for processing.

Figure 2A:
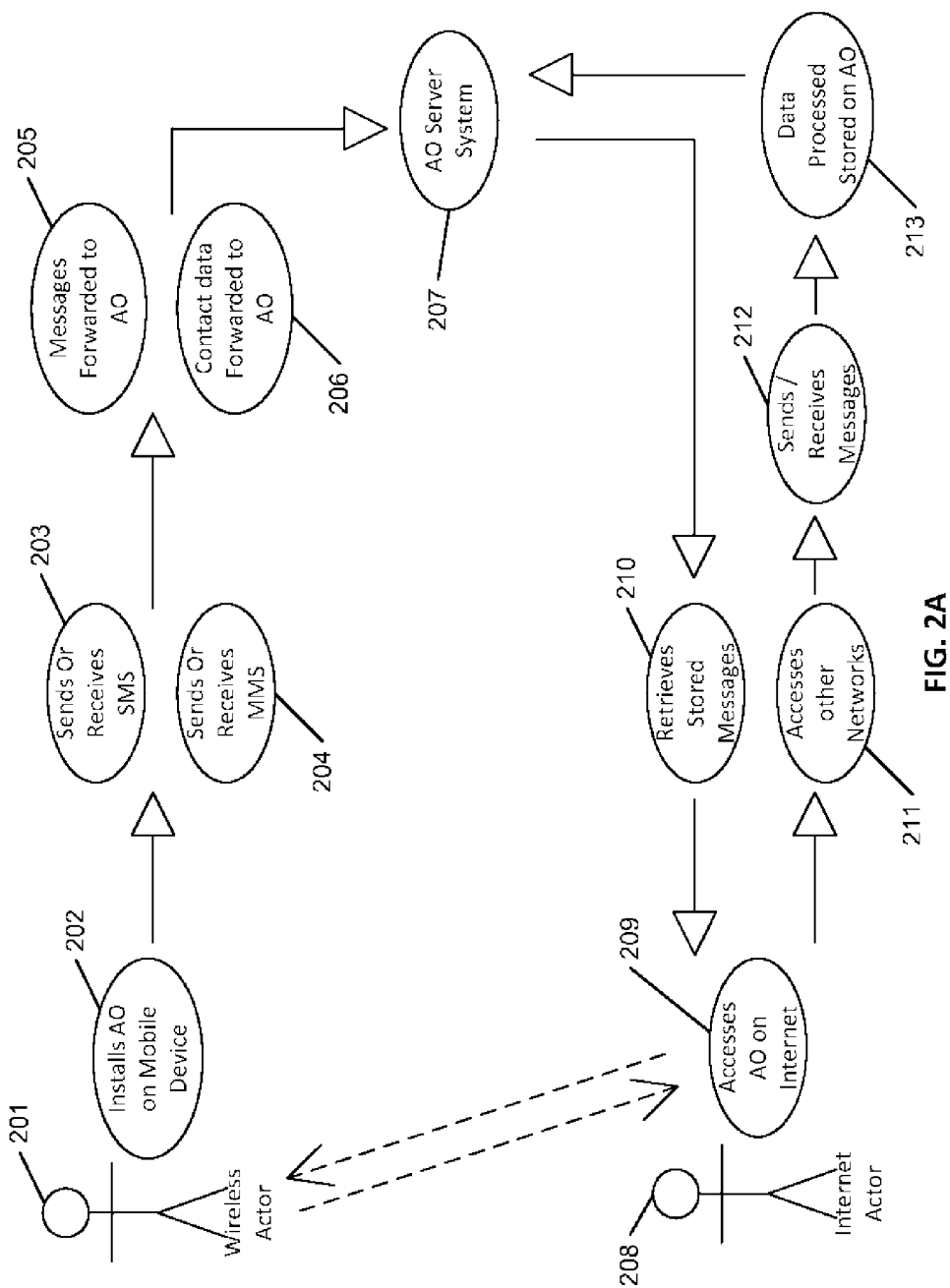
FIG. 2A is a diagram of an example use case of out-of-band SMS and MMS forwarding and message management.

An example high-level use case is described below, which illustrates the utility of out-of-band SMS and MMS forwarding and message management. FIG. 2A illustrates an example use case of out-of-band SMS and MMS forwarding and message management.

In FIG. 2A, a wireless actor 201, who has an application 202 provided by the messaging system installed on their mobile device, sends or receives an SMS 203 or MMS 204 message. These messages are then delivered 205 to the messaging system 207. At the same time, relevant contact and contextual data from the device is also delivered 206 to the messaging system 207.

The SMS and MMS message delivery is effectively 'out-of-band' at this point. Messages are not sent using the traditional wireless signaling or delivery channels, nor with the normal SMS and MMS protocol. Rather, they are delivered directly to the messaging system servers after determining which of the available alternate network methods provides the best connectivity and performance. At this point delivery may be over standards-based protocol. Delivery may be facilitated by the method described below in FIG. 2D and further in FIG. 8—utilizing a proprietary delivery method which is part of the messaging system.

In turn, an Internet-based actor 208 may access their messaging system account 209 and retrieve these stored messages 210 from the messaging system 207. They also may log into multiple alternate messaging and social networks 211 and communicate with members of these networks 212. All data from these communications will be likewise stored by the messaging system 213.

Finally, a dotted line connects the Wireless actor 201 with, "Internet access" as many wireless devices will provide this same type of Internet browsing, HTTP access to the portion of the system via a web browser of a wireless device.

Figure 2B:
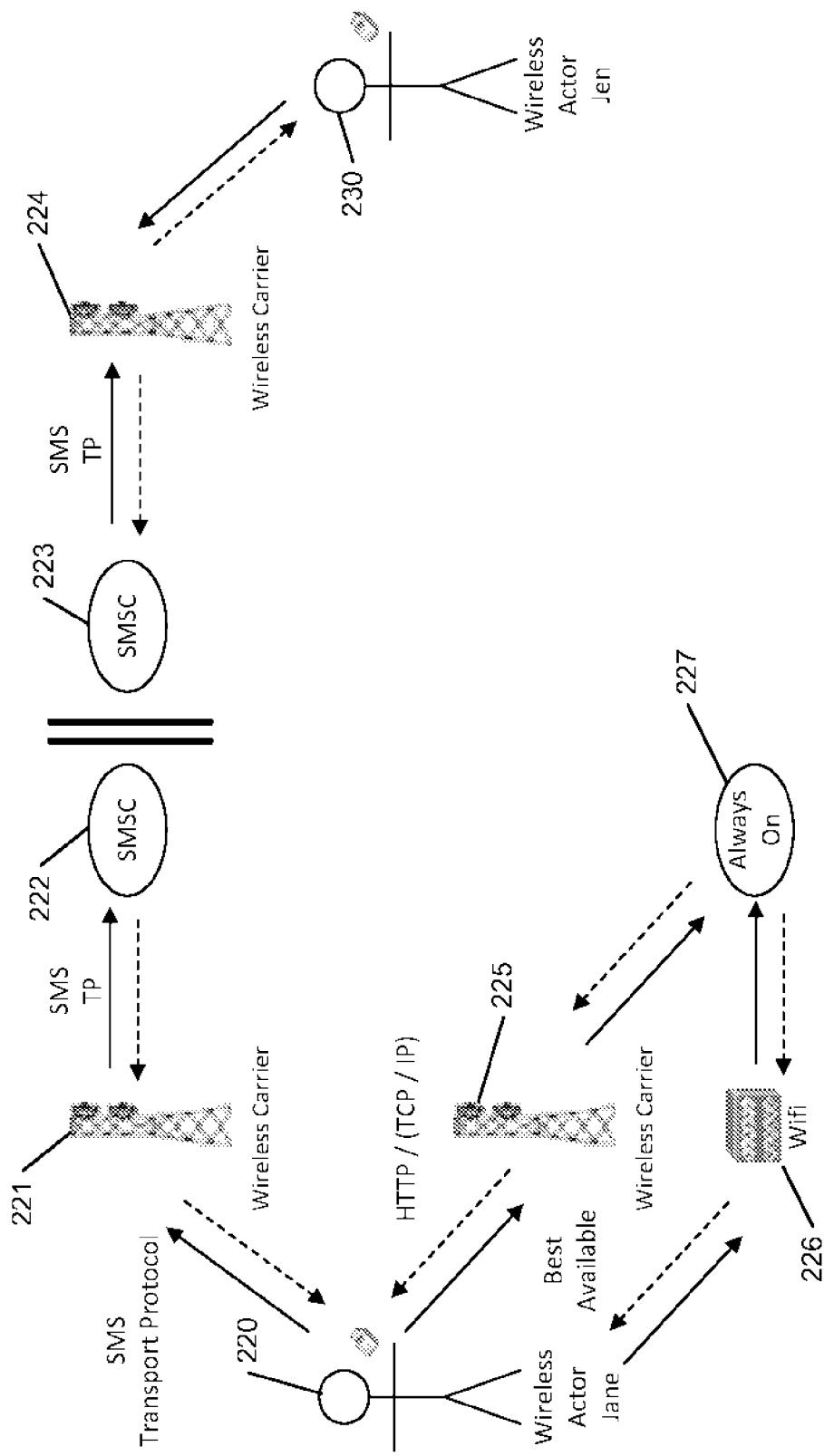
FIG. 2B illustrates an example of a wireless actor sending to and then receiving an SMS response from another wireless actor.

FIG. 2B illustrates an example of a wireless actor 220, Jane sending to and then receiving an SMS response from another wireless actor 230, Jen.

The SMS is sent to the wireless carrier 221 using the SMS Transport Protocol (SMSTP). The SMS-based application implements with the SMSTP Protocol Stack. In this example, the message is sent on the Short Message Service Center (SMSC) 222 where it is stored and then forwarded to another SMSC 223 for delivery to the final recipient over the wireless carrier 224. In this example, both Jane and Jen's mobile devices are Short Message Entities (SME) in the system.

Further, in FIG. 2B, actor Jane 220 has an application provided by the messaging system installed on her mobile device. Here, each SMS she sends and receives is retrieved from the device by the application and delivered on using the best available data connection via HTTP over TCP/IP to the messaging system service 227. If using the wireless carrier 225, this data could go over the Internet to the destination or in the case where the system is resident within a carrier infrastructure, over an internal or private network. If using a Wi-Fi or other wireless connection 226, the data goes through the local access point to the Internet and on to the messaging system service 227. In either case, this may happen in real time, within milliseconds of the device completing a send or receive of an SMS message. Accordingly, the actor's content, context, location and metadata are updated in real time on the service.

In FIG. 2B. Jane and Jen are described as the sole actors for brevity. The system is designed for a carrier-scale actor base where many more actors exchange messages.

Figure 2C:
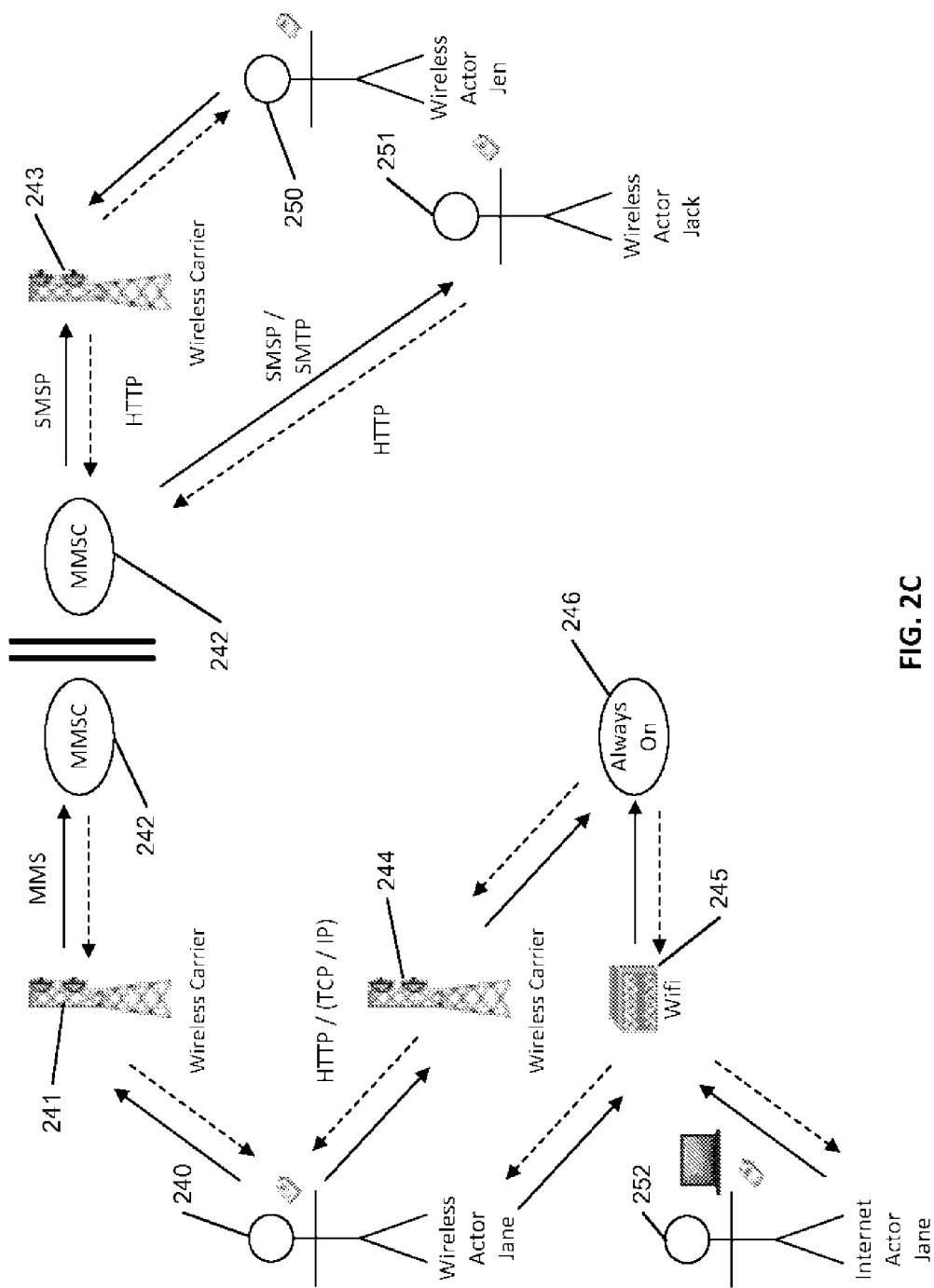
FIG. 2C illustrates an example of a wireless actor sending to and then receiving an MMS response from another wireless actor.

In FIG. 2C, Jane, Jen and Jack are actors in an MMS environment. Jane, as a wireless actor 240, sends an MMS to Jen 250 and Jack 251. This message is encoded and sent through the carrier 241 to the MMS Center (MMSC) 242. The MMSC 242 comprises several systems, servers and functions. Part of its function is to determine the capabilities of the recipient mobile device.

In the case of Jen 250, the MMSC 242 determines to deliver the MMS message through the wireless carrier 243 based on the capabilities of Jen's mobile phone. Accordingly. Jon's mobile phone receives an SMS control message notifying her of Jane's MMS message and her phone retrieves the encoded portion of the MMS (the attachment) via HTTP.

In the case of Jack 251, the MMSC 242 determines to deliver the MMS message directly based on the capabilities of Jack's mobile device. Accordingly, Jack 251 is sent an email with a URL notifying him that a multimedia message has been sent and the URL points to a location where the message can be retrieved.

There are many other cases involving MMS delivery that may be used. Implementations may include other cases of MMS delivery, where MMS delivery is occurring through a dedicated MMS infrastructure and process.

Further, in FIG. 2C, Jane, as wireless actor 240, has an application provided by the messaging system installed on her mobile device. Her sent (or received) MMS is forwarded to the messaging system service 246 via the wireless carrier 244 along with contact, location and metadata or via local network connectivity such as Bluetooth or Wi-Fi 245 from the mobile device via HTTP depending on the best available processes within the messaging system mobile device application. The messaging system mobile device application also utilizes recent or historical usage characteristics and the amount of data included in the message to determine the best connection method.

Finally, Jane or a third-party system, as an Internet-based actor 252, may also retrieve her MMS messages and attachments via a web browser over the Internet 245. This may include mobile device retrieval on a device with such capabilities, from a personal computer or via application programming interface by a third-party system.

In FIG. 2C, Jane, Jen and Jack are described as the sole actors for brevity. The system is designed for a carrier-scale actor-base where many more actors exchange messages.

Figure 2D:
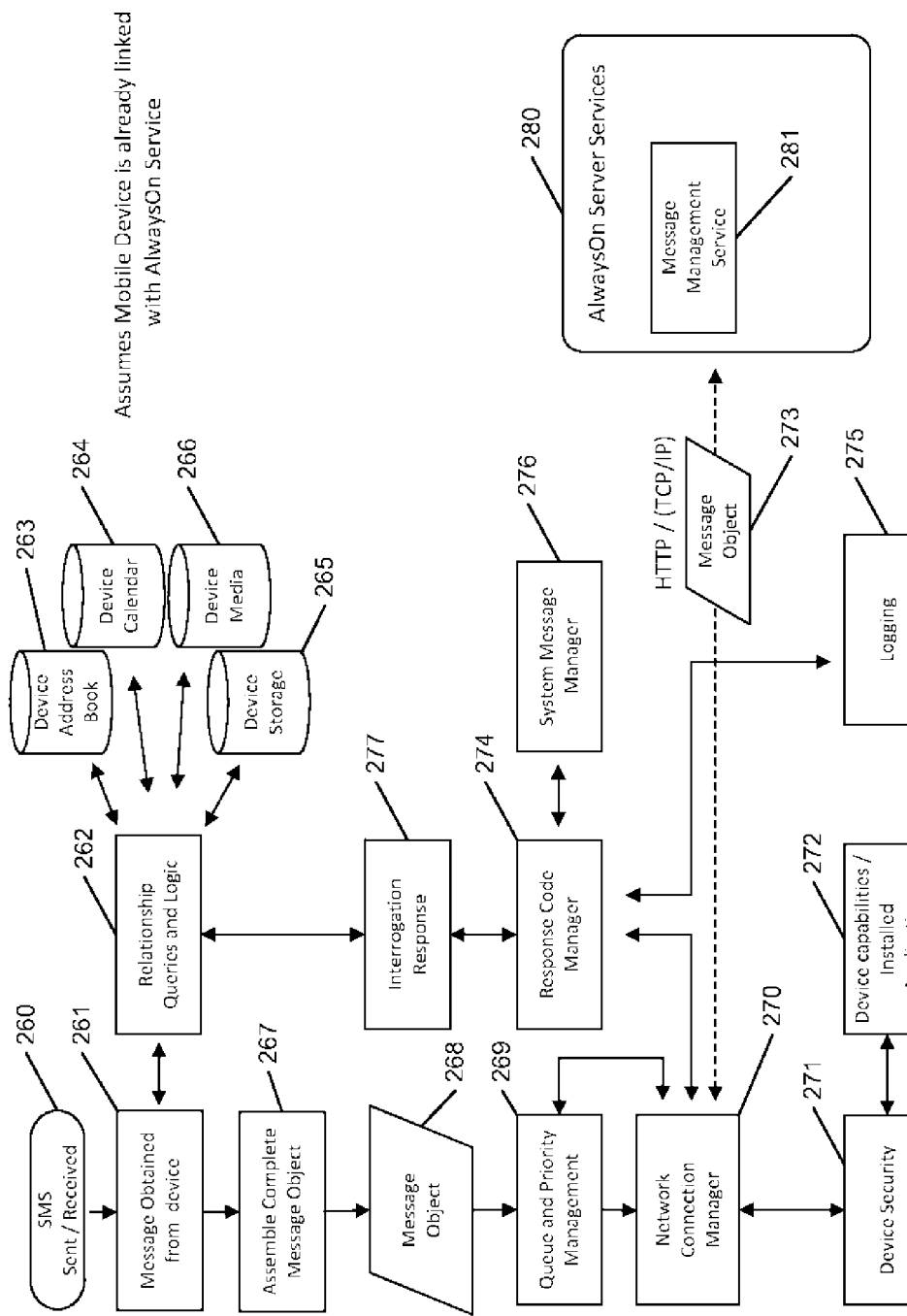
FIG. 2D illustrates an example process that isolates the mid-level application flow for the wireless device component of the system where a user sends or receives an SMS message.

FIG. 2D illustrates an example that isolates the mid-level application flow for the wireless device component of the system where a user sends or receives an SMS. FIG. 2D illustrates the function of a single mobile device utilizing the software and services for brevity. The system is designed for a carrier-scale user-base.

FIG. 2D assumes that the mobile device application provided by the messaging system is running on the mobile device and that the device is already securely linked to the services. Linkage of the device and the services may be implemented through any linking mechanism.

When an SMS message is sent or received (260), the mobile device application acquires the message and sender or recipient list from the device (261). This is accomplished using different methods on different mobile devices and is dependent upon device operating system and capabilities.

When a message is obtained by the application (261), the remote party's contact details are retrieved from the device (262). For instance, the remote party's contact details may be retrieved from an address book storage 263 that stores contact details for the mobile device.

Further queries (262) of the device may be performed based upon the contents of the contact details. Systems that may be queried include the device calendar 264, device storage 265, and other media 266 within the device providing meta data such as time, location, biometrics, device activity, user interaction characteristics and more. Any information from the device may be queried and retrieved for delivery with the SMS message. The additional information may be used for context of the interaction to enable the messaging system to learn more about the interaction and provide enhanced processing of the SMS message based on the additional information.

The final message or messages are assembled (267) into a message object 268, which includes the SMS message and relationship data (e.g., additional information retrieved based on the queries). The message object 268 may be passed on to a queue where each message's priority is evaluated (269). The queue includes outbound messages, their priority and status, and re-queued messages that have failed for various network or device anomalies, such as data transmission errors, network timeouts and data connection type failure as determined by Network Connection Management 270.

The system includes Network Connection Management 270 that derives the best available network connection to use to send data to the messaging system servers 280. This is evaluated based on multiple factors including network type availability and historical performance. Once a message is ready to be delivered, the appropriate device and security information is appended (271). The appropriate device and security information may be appended by evaluating the device capabilities and/or installed applications (272).

Once a message 273 is sent to the messaging system servers 280, a response code is generated by a message management service 281. The response code is sent back to the mobile device. The response code indicates whether the message has been successfully received, included errors, failed for some reason, and whether there is any further action requested by the messaging system servers 280. The response code is passed to a response code manager 274, which performs logging (275) of response codes (and data indicating success/failure of message transfer) and interacts with a system message manager 276 to ensure messages are properly transferred and appropriate actions are taken in the Client of a failure. When further action is requested by the messaging system servers 280, response code manager 274 initiates an interrogation response process (277) to collect more information from the mobile device or determine that the requested information does not exist.

The messaging system servers 280 may indicate that there are notifications for the mobile device user and a facility is provided by the mobile device application to present the user with this notification in real-time. This further permits contextual, social and location-based notifications to be facilitated without any explicit user interaction with the system.

The messaging system servers 280 may also return a response code which requests the mobile device to further interrogate the mobile device system for further relationship data, system capabilities, application logs or any other available data accessible by the device. The interrogation response process (277) may be used to satisfy the request.

Figure 2E:
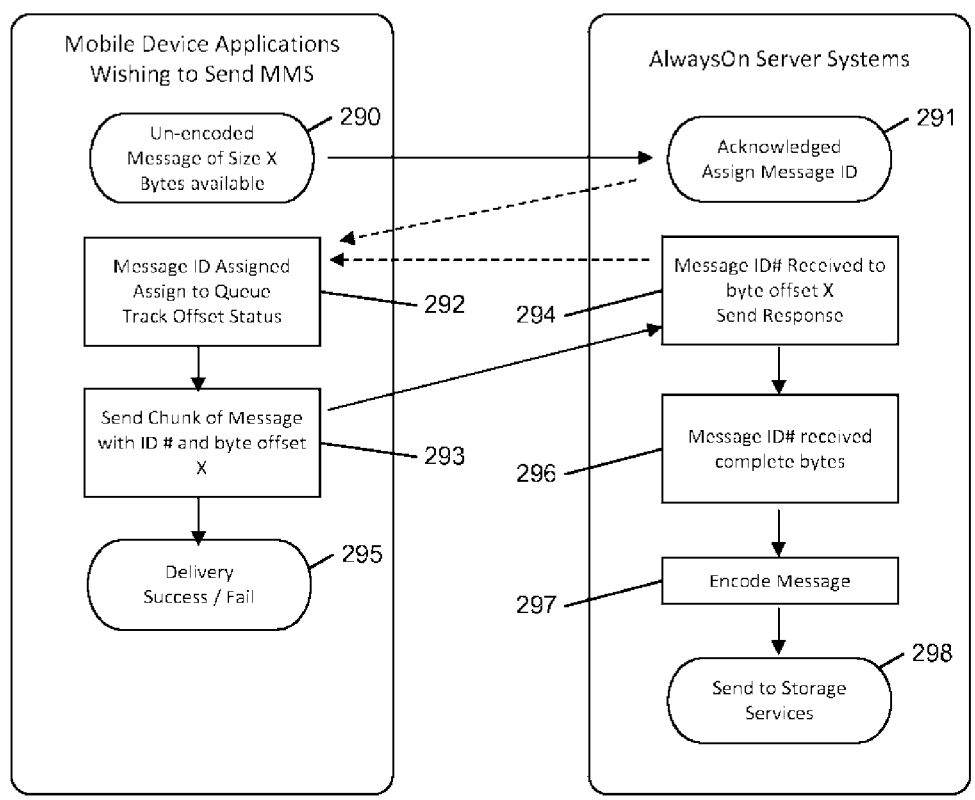
FIG. 2E illustrates an example process for handling MMS messages.

MMS processing utilizes the same component flow as stated for SMS in FIG. 2D with the variance described herein and in FIG. 2E.

Encoding of large MMS attachments in preparation for transfer to the messaging system server services may affect the performance of the mobile device. A solution was implemented which permits the mobile device to forward the MMS message and multi-media attachments without encoding on the device. This method is defined further in Section 8.

From the mobile device application, the components illustrated in Figure FIG. 2D as Queue and Priority Management, Network Connection Manager and Response Code Manager perform additional functions when processing MMS. Likewise, from the Message Management Service in the messaging system server services location performs additional duties when managing MMS. These additional duties are highlighted in FIG. 2E. In this regard, FIG. 2E illustrates an example of managing MMS messages.

Instead of using mobile device system resources to encode MMS messages, the mobile device application notifies the messaging system server services that it would like to send a large un-encoded file of total byte-length N (290).

The messaging system acknowledges this and provides a message ID to assign to the incoming MMS message (291). The message ID may be communicated to the mobile device application by the messaging system over a wireless network. Upon receipt, the mobile device application assigns the message ID to a queue associated with the MMS message and tracks offset status for transfer of the MMS message (292).

The MMS message will now be sent in fixed byte-length chunks to the messaging system. Each chunk will include the message ID assigned and an offset indicating up to what number of the total bytes in the message is being sent (293).

The messaging system server will respond with success or failure for each chunk (294) and the Response Management and Queue and Priority Management on the Mobile Device will manage subsequent chunks. For instance, the mobile device application may determine whether transmission of each chunk was a success or failed and continue to attempt to transmit chunks that have failed in transmission (295).

Once the final byte is received, the server will notify the Mobile Device (296), encode the message (297), and forward it to Storage Services for processing and storage (298).

This approach may free the mobile device from the processing and encoding of large media and may transfer the effort to the Server Systems and is defined further in Section 8. Of course, this method will also facilitate uploading of otherwise encoded data maximizing system performance and network availability.

Section 3—Method and System for Social Network Creation, Expansion and Update with Mobile Device Interrogation.

An example high-level use-case is described below which illustrates human network connections being derived in real-time. A trigger to deriving the connection is the sending or receiving of an SMS/MMS message from a given contact. As messages are forwarded to the messaging system servers as defined in Sections 1 and 2, contact information and other relevant data, such as media files, calendar appointments and notes, may be sent as well. The contact becomes part of the user's observed network in real-time. In turn, more information can be derived through query of the messaging system about the connection, extending the reach and context of the relationship(s). In the case where the system has already acquired a contact or acquired contact data in bulk, this interaction further facilitates the social-networking processes to ascribe relevance to discrete contacts in real-time.

The social network connection is derived from actual behavior as opposed to a subject's self-defined social network or implied network from other users. For example, the social network is derived in real-time, rather than after-the-fact data processing, which allows for the context and content of a message or messages to affect the social network definition, manages changes to the network based on real-time data provided from the mobile devices, and provides a mechanism to interrogate the mobile device for further relationship, context and content data. The social network connection is derived without requiring input from the user other than behaviors the user has already undertaken using his or her mobile device and, or other communication devices.

Figure 3A:
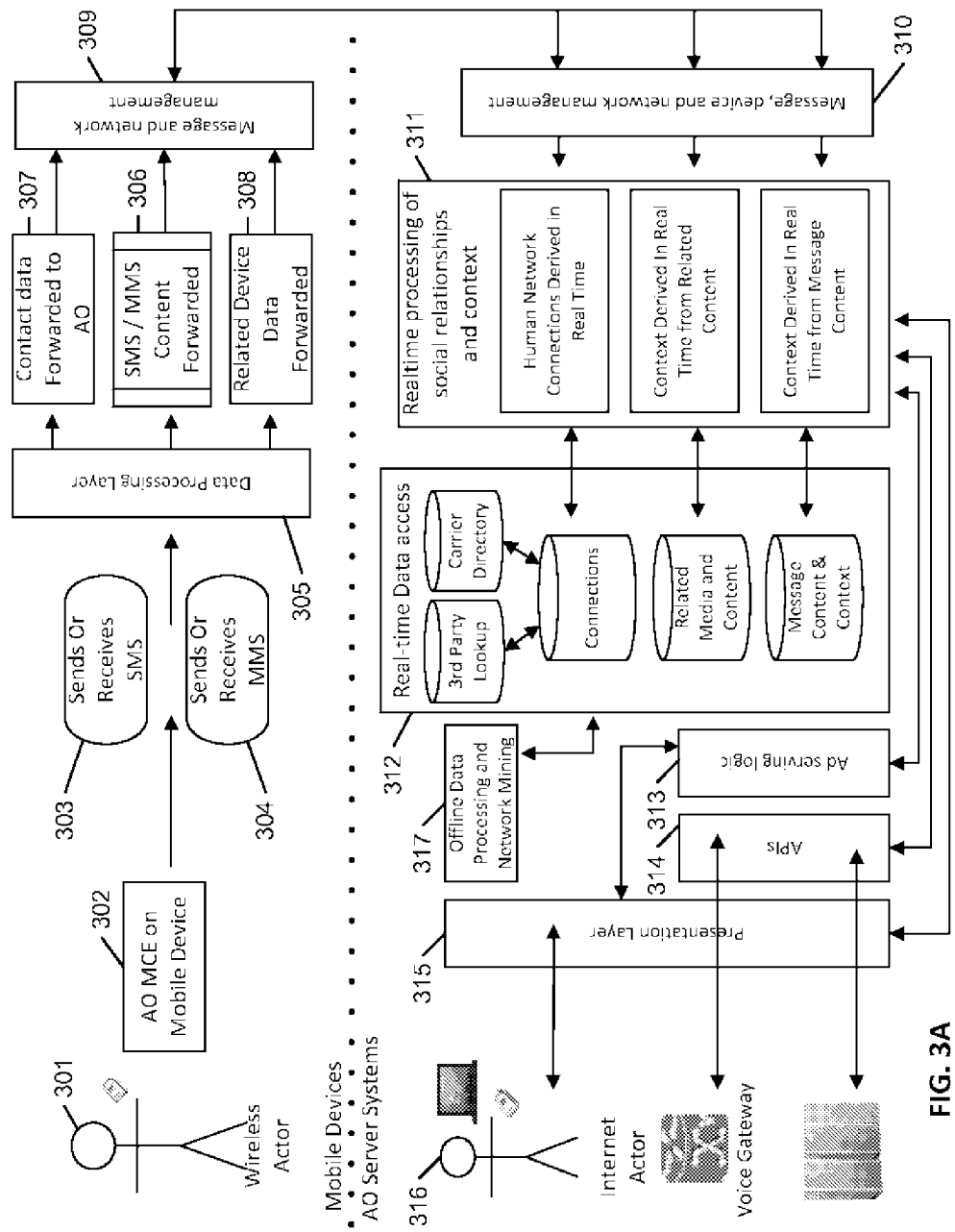
FIG. 3A illustrates an example system configured to derive social network connections.

FIG. 3A illustrates an example system configured to derive social network connections. In FIG. 3A, a wireless actor 301 has a mobile device application provided by the messaging system (e.g., AO Mobile Client Extensions) 302 installed on their mobile device. Mobile Client Extensions (MCE) may include methods and actions required for the mobile device to participate in the disclosed system.

Upon sending or receiving an SMS 303 or MMS 304 message, the message is processed 305 by the MCE. The contents of the message, system data, message data, geographic location, remote sender/recipient data and other relevant data are sent 306 to the messaging server system as described above in Section 2.

If a contact entry is included on the device for the remote message sender/recipient, that contact data is also delivered 307 to the messaging server system.

If related content, such as a document, multimedia, calendar, notes or other data on the mobile device, includes data relevant to the remote sender/recipient, the meta data or actual content of such data may be delivered 308 to the messaging server system.

The data (e.g., message content 306, contact entry 307, related content 308, etc.) is sent to the messaging server system by a message and network management component 309 of the MCE. Once the data is received 310 by the messaging server system, the social network is built in real-time 311. This allows third-party applications to comprehend the social links of a wireless user in real-time and to react to same.

The disclosed system provides a facility 311 to derive the social network based on the remote sender/recipient and further interrogate local and remote databases 312 for further relationships in real-time.

The system provides a facility 311 to derive and record the context of the discourse between the wireless user and the remote sender/recipient. This data is likewise stored and can be accessed in real-time by the system and third party applications.

The disclosed system provides a facility 311 to derive further contextual, event and human relationships based on other data delivered from the mobile device which was determined to be relevant to the discourse with the remote sender/recipient. The facility 311 evaluates all of the information received from the mobile device and available through other channels to derive, without user input, a social network for the user in real-time based on actions being taken by the user and other contextual information associated with those actions (e.g., other contact data, geographic location information, etc.).

Ad serving logic 313 leverages these relationship and context data to make assertions about what ad server systems to query and/or what ads to serve to the user.

The data is then made available is Application Programming Interfaces (API's) 314 and a presentation layer 315 for third-party systems to query and for the user 316 to access is multiple types of Internet connections. The API's 314 provide access to third-party systems, developers, and interfaces that can leverage relationship and contextual relationship to provide enhanced features.

The messaging server system also includes a facility 317 for offline data processing and network mining. The facility 317 may analyze data collected by the messaging server system regarding specific users or groups of users and derive further information about relationships and interactions based on the analysis. Because the facility 317 processes data when the user is offline, the facility 317 may be configured to perform more detailed analysis and may consider more information than the facility 311 that derives real-time social networks. For instance, the facility 317 may analyze information collected over a greater period of time to derive historical trends and relationships for one or more users over a longer period of time (e.g., weeks, months, years, etc.).

Figure 3B:
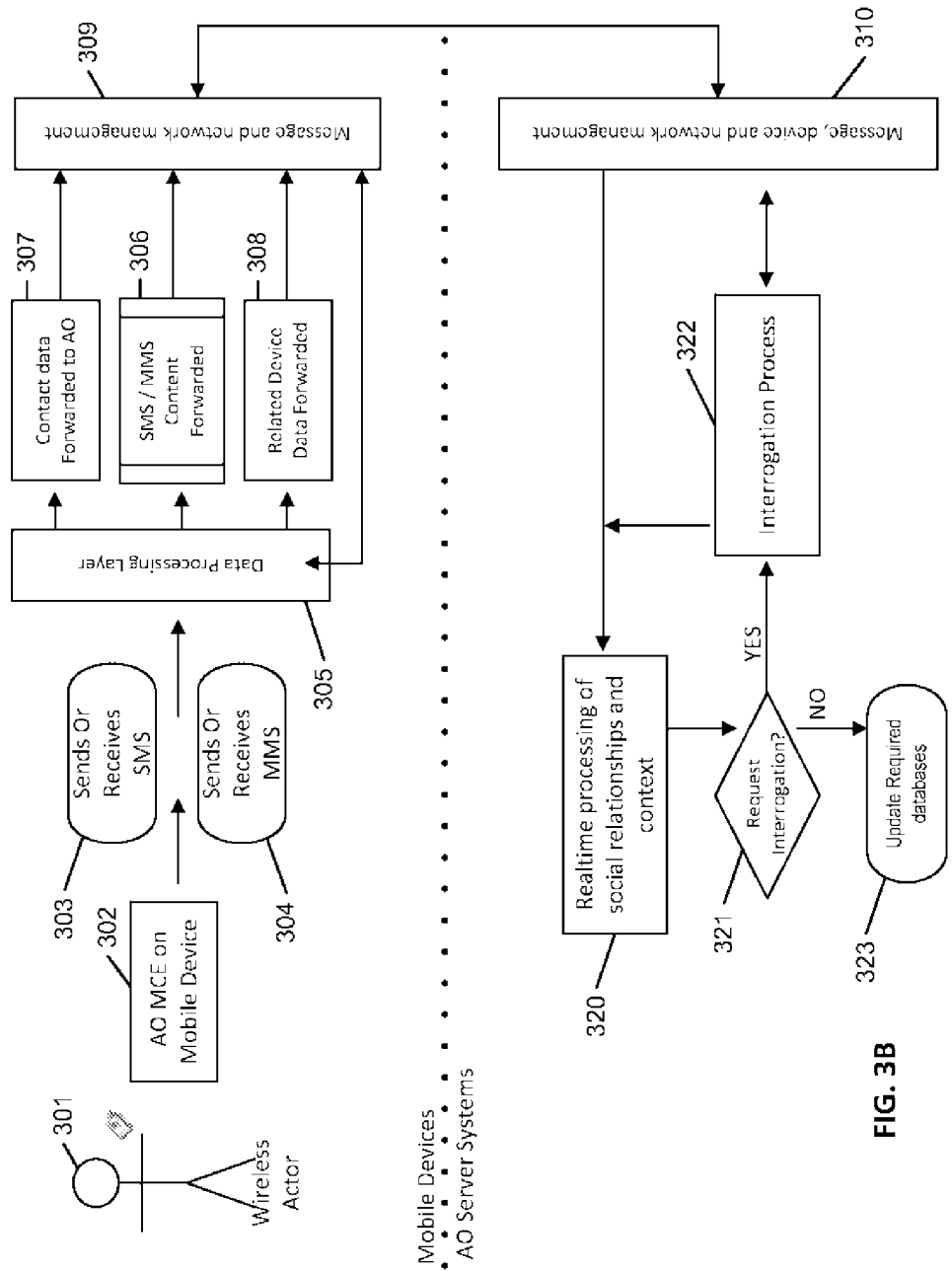
FIG. 3B illustrates an example process for mobile device interrogation based on an inquiry from the messaging server system.

The system is configured to perform a process for mobile device interrogation based on an inquiry from the messaging server system. FIG. 3B illustrates an example process for mobile device interrogation based on an inquiry from the messaging server system. In FIG. 3B, during processing of the real-time data received from the wireless device 320, the system determines whether additional information is required or would be helpful in deriving relationships 321. If during processing of the real-time data received from the wireless device 320 or based on system or manual cue, the system determines that additional information is required or would be helpful, an interrogation process 322 sends a request from the server which notifies the mobile device application (e.g., AO MCE) that further information related to a specific message or user is requested. The device software will query the mobile device for further relevant data and forward it back to the messaging server system. The system updates one or more databases 323 with the real-time data received from the wireless device. If additional relevant data was requested and received, the system updates one or more databases 323 with the additional relevant data along with the initial real-time data (e.g., message object data) received from the wireless device.

Figure 3C:
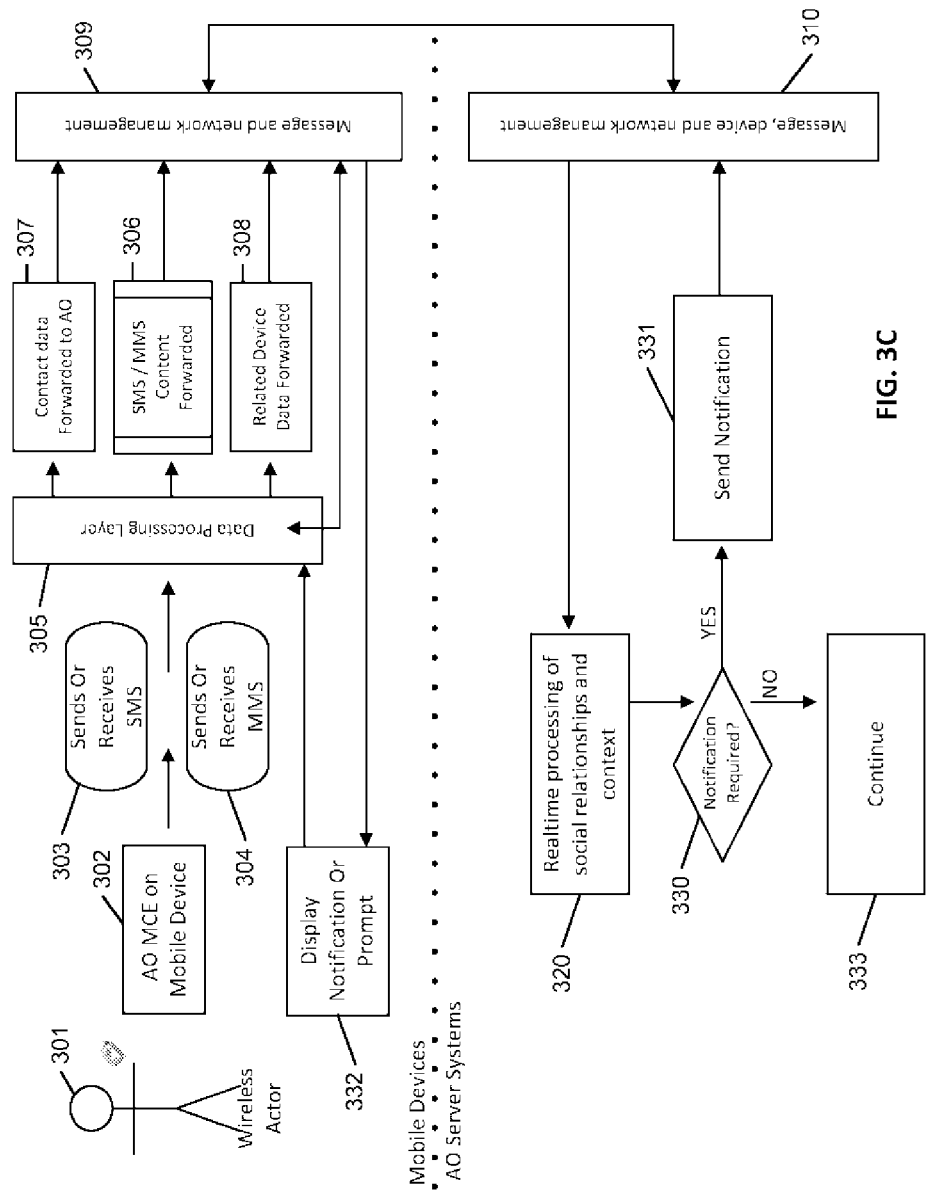
FIG. 3C illustrates an example of a process to notify a user of social network connections, events, relationships established based on the context of conversations and other data received by the messaging server system.

The disclosed system is configured to perform a process to notify users on the wireless device of social network connections, events, relationships established based on the context of the conversations and other data received by the messaging server system. FIG. 3C illustrates an example of a process to notify a user of social network connections, events, relationships established based on the context of conversations and other data received by the messaging server system. As shown in FIG. 3C, during processing of the real-time data received from the wireless device 320, the system determines whether to send a notification based on processing of the real-time data 330. For example, the system may determine to send a notification when a new connection has been identified. In this example, the notification may identify the new connection and may indicate that the new connection has been automatically added to the user's social network or request the user to confirm that the new connection should be added to the user's social network.

If during processing of the real-time data received from the wireless device 320, the system determines to send a notification, the system sends a notification 331 from the server to the mobile device application (e.g., AO MCE). The notification may notify the mobile device application that one or more new social network connections, events, or relationships have been established or identified. The device software displays the notification 332 to inform the user of the new social network connection, event, and/or relationship. The notification 332 may prompt the user for additional information or authorization (e.g., permission to add a new user to the user's social network or permission to request a new user to join the user's social network). Additional information and/or authorization may be sent to the messaging server system based on the user's interaction with the notification 332.

If during processing of the real-time data received from the wireless device 320, the system determines not to send a notification, the processing of the real-time data received from the wireless device 320 continues 333. The process shown in FIG. 3C can also be invoked based on off-line processes or manually invoked by a system administrator.
Section 4—Method and System for Building, Aggregating and Synchronizing Contact Lists from Multiple Modalities.

Techniques are described for using mobile devices as a data source and trigger for list building. In some implementations, the best-available network connections on a mobile device are determined and used to send and retrieve contact details to and from a central system. Message types include in and outbound voice calls, SMS, MMS, email, instant messaging and third-party social network traffic. For each message sent or received, the relevant contact data is forwarded to the central server.

The system thereby allows users to aggregate multiple contact lists into one centrally available system where they can be checked against information provided by other users, the contact themselves or third-party resources.

Forwarding of the contact data can be accomplished iteratively, as each message is sent or received and each contact lookup is achieved, or in bulk based on user settings.

Advantages of iteratively creating, updating or evaluating the central contact list may include:

Reduced processing on the mobile device to retrieve one contact match and forward.
Reduced bandwidth used to forward contacts iteratively as user messaging dictates (iterative list building).
By using iterative interactions to dictate which contacts are sent, contact lists are filled with only relevant users with whom communication occurs.

Figure 4A:
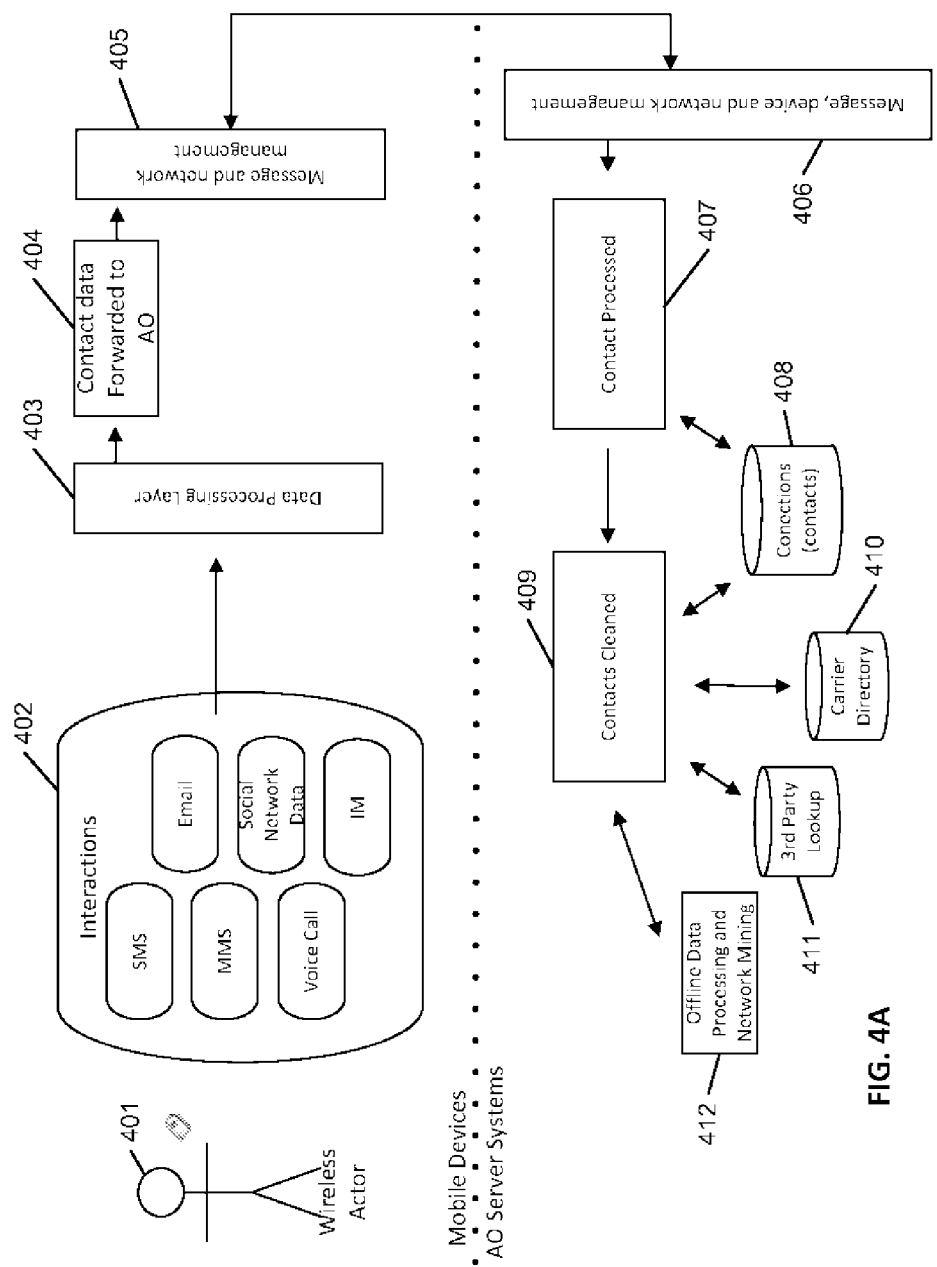
FIG. 4A illustrates an example system for building, aggregating and synchronizing contact lists from multiple modalities.

FIG. 4A illustrates an example high-level view of this system. A user 401 uses a device to perform multiple types of interactions 402. As each type of interaction occurs (e.g., as each message type is sent or received), the device processes the interactions (e.g., messages) using a data processing layer 403. In processing the interactions (e.g., messages), the device checks the address book and forwards any relevant contact information 404 to a central server over the best-available network connection. For instance, the device uses a message and network management component 405 to send relevant contact information to a messaging system server, where the relevant contact information is received at a message, device and network management component 406.

For each message sent or received, or voice call placed, the unique identifier required to technically facilitate that communication with the remote user is used to perform a contact look up. That is, if a voice call is placed, the relevant phone number, IP address (in the case of an IP call) or SIP address may be used to retrieve contact details of the match. In the case of SMS and MMS, the remote phone number is used to attempt to make a match in the mobile device address book. In the case of email, the email address is used. In the case of third-party social networks, a combination of unique identifiers and queries are used to attempt to extract contact details from the device.

This is distinguished from bulk synchronization of contacts with a discrete application over the air or via a hard-wired connection to a personal computer. Such synchronization is accomplished without any intelligent guidance for contact priority and is scheduled or manually implemented. In this system, all contacts are aggregated and categorized by the system based on actual interactions with users—contacts are iteratively gathered and processed based on actual user interaction and hence relevance to the user. Further, the system aggregates contacts for which the device user has made no entry so that the system may provide further contact generation using alternate data sources in real-time. And does all of this without any scheduling or manual intervention from the user across multiple modalities.

In FIG. 4A, a high-level view of the system is provided. After contact information is received, the received contact information is processed 407. For instance, a contact may be processed to determine whether full contact information is available in the contact and whether any information for the contact is already stored at the messaging server system. If full contact information is included in the contact and no other contact information exists at the messaging server system, the messaging server system may store the contact in a connections (e.g., contacts) database 408.

If full contact information is not included in the contact and/or other contact information exists at the messaging server system for the contact, the messaging server system may attempt to clean the contact information 409. For example, when contact information is missing from the contact provided, the messaging server system may attempt to see if the missing information is available through another source. In this example, the messaging server system may check the connections (e.g., contacts) database 408 and determine whether the missing contact information is already stored. If the missing contact information is not already stored, the messaging server system may check a carrier directory 410 or another third party source 411 to determine whether the missing contact information can be obtained and added to the contact.

In another example, when contact information is already stored in the connections (e.g., contacts) database 408 for the received contact being processed, the system may determine whether the received contact information includes additional information relative to the information already stored for the contact and/or whether the received contact information includes inconsistent information relative to the information already stored for the contact. When the system determines that the received contact information includes additional information relative to the information already stored for the contact, the system supplements the contact stored in the database 408 with the additional information. When the system determines that the received contact information includes inconsistent information relative to the information already stored for the contact, the system attempts to resolve the inconsistency. For instance, the system may query the carrier directory 410 or the other third party source 411 to determine whether the inconsistency can be resolved without user input and, if not, provide a notification to the user that indicates the inconsistency and requests the user to identify the appropriate contact information.

The messaging server system also includes a facility 412 for offline data processing and network mining. The facility 412 may analyze contact data collected by the messaging server system regarding specific users or groups of users and derive further contact information and/or validate contact information based on the analysis. Because the facility 412 processes data when the user is offline, the facility 412 may be configured to perform more detailed contact cleaning analysis and may consider more information than the initial contact cleaning 409. For instance, the facility 412 may analyze contact information collected over a greater period of time and for many users within a social network in an effort to supplement and validate contact information for particular users. The facility 412 also may analyze stored data regarding actual interactions occurring with the contact information to determine which contact information is accurate/preferred by the contact and determine additional information about types of contact information (e.g., whether an email address or phone number is a work account or personal account, etc.).

Figure 4B:
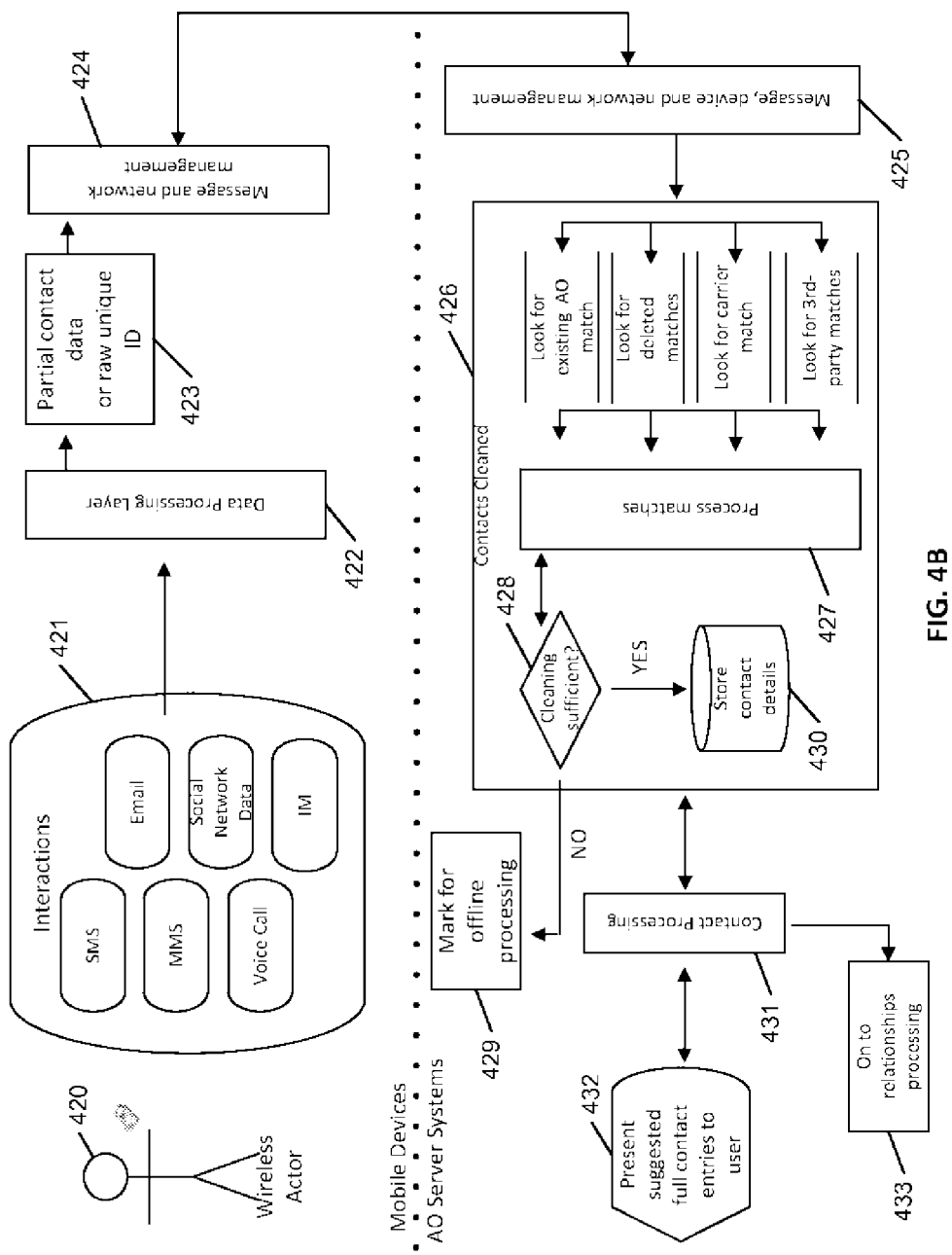
FIG. 4B illustrates an example in which no contact information (or only partial contact information) is available in the mobile device.

In a situation in which no contact information is available in the mobile device directories, the unique identifier of the remote party in the interaction is still sent to the messaging server system (e.g., phone number, email, IM address, PIN, etc.). This data may then be used in queries against internal and external systems in order to present the user with possible matches for a complete contact. Once the user indicates that a match is correct it may be added to their central contact list. Based upon user configuration, contacts may be updated back on the mobile device once the user accepts the entry. FIG. 4B illustrates an example in which no contact information (or only partial contact information) is available in the mobile device.

In FIG. 4B, a wireless user 420 interacts 421 with a remote user. The data is processed by the mobile device application on the mobile device 422. After it is determined there is no direct match in the user's contact database, the unique identifier of the remote party in the interaction is forwarded to the messaging server system 423. For instance, the device uses a message and network management component 424 to send the unique identifier to a messaging system server, where the unique identifier is received at a message, device and network management component 425.

The messaging system server attempts to process and then clean the unique identifier to determine if a contact match can be made 426.

In parallel, the system searches through all of the existing messaging system users and all deleted users. The system searches contact entries that have been marked as deleted by mobile devices for matches.

The system may also query the carrier database in real time should the unique identifier of the remote party be a traditional phone number. This would be the case if the interaction is a voice call, SMS or MMS among other interactions.

At the same time the system checks third-party databases for matches related to the unique identifier received. These may include remote systems that manage short codes (SMS), alternate carrier databases, etc. The system also may check social networking sites and other third-party databases.

Matches are returned and processed 427 by the system and ranked for relevance. The system determines whether sufficiently relevant matches are found 428. If no sufficiently relevant matches are found, the unique identifier is marked for further offline processing and the contact is added to the user's contact list as solely the unique identifier 429.

If a single sufficiently relevant match is found, the contact is added to the user's contact list 430. The system processes stored contact details 431 based on the contact cleaning and presents suggested full contact entries to the user 432. In the case of multiple matches with sufficient relevancy, the system will then display to the user that this contact has multiple matches and permit the user to select the correct details, or complete the contact details themselves. After contact details have been processed, the system proceeds to (or continues to) process relationships for the user 433.

Section 5—Method and System for Message Aggregation Over Multiple Modalities.

The system provides a facility for aggregation of wireless-dedicated and internet-based communication content types into consolidated data stores and presentation.

The system provides a facility to maintain connections to multiple disparate messaging networks and systems while logging all instant messaging and third-party social network traffic and present it in a unified presentation.

The system likewise logs all SMS, MMS and other proprietary mobile messaging types and presents it in the same unified view.

All communication conducted between a user of the system and a remote communicator is logged and aggregated in this manner.

Connections are maintained with multiple third-party networks that are aggregated into a single view of 'network connections.'

Remote connections on these networks may be presented as members of the discrete network with which they are identified or as members of the over-all universe of connections.

Communications with all of these users are aggregated.

Communications with mobile users, to and from remote mobile devices may be aggregated into the network universe thereby presenting mobile user messaging along side, social network connections and instant messaging colleagues.

Actual mobile device data is integrated into the aggregated view.

Figure 5A:
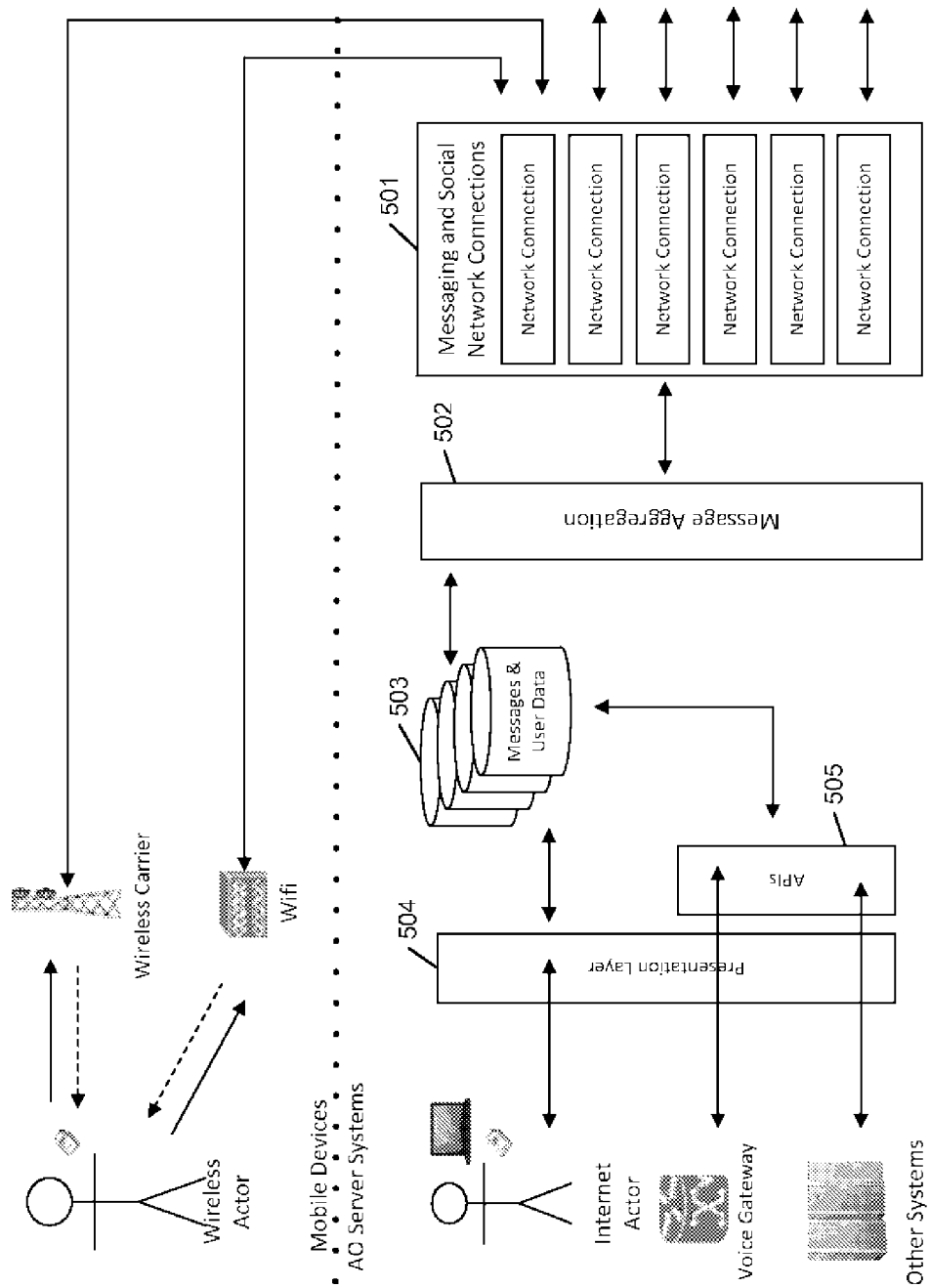
FIG. 5A illustrates an example system configured to aggregate messages.

FIG. 5A illustrates an example system configured to aggregate messages. In FIG. 5A, the system maintains connections 501 with multiple instant messaging, social networks and mobile user devices.

All messages sent to and from each of these modalities are aggregated 502 within the messaging system server infrastructure and stored in one or more databases 503. The aggregated messages are made available for presentation to the user is a presentation layer 504 and made available to remote access by third parties via APIs 505 and to remotes systems via APIs 505.

Figure 5B:
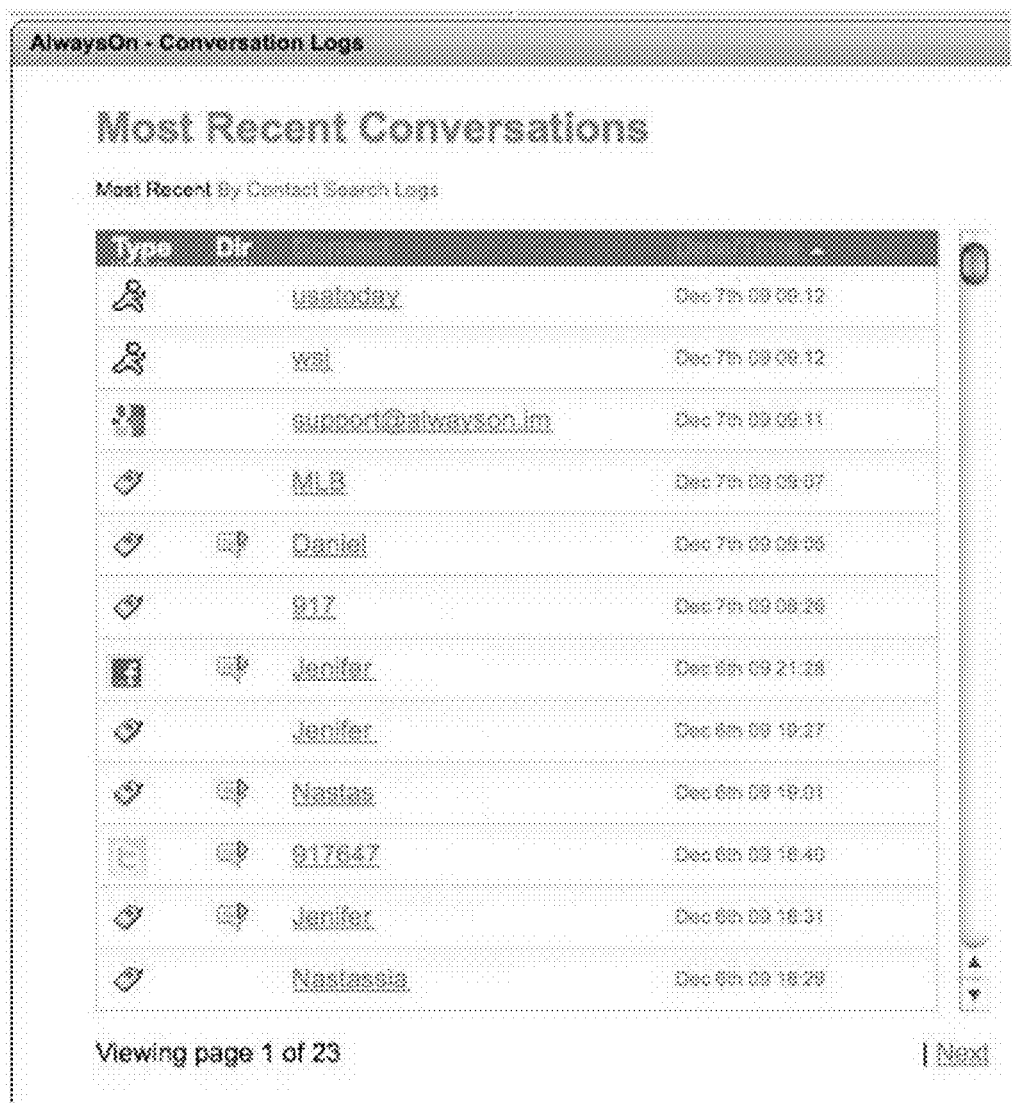
FIG. 5B illustrates an example interface that shows aggregated messages from multiple, different communication modalities.

FIG. 5B illustrates an example interface 510 that shows aggregated messages from multiple, different communication modalities. In FIG. 5B, all communications sent and received are aggregated into relevant conversation threads and presented to the user via a web browser. In this example, a user can view interactions from their mobile devices, instant messaging, devices and social networks in one location. As shown, messages from mobile, instant and social network messaging are presented in a consolidated view.

In addition, a single conversation thread between the user and one or more other users may include communications exchanged over any of the modalities supported by the system. Further, the aggregated messages may be used for the social network processing and contact information processing described throughout this disclosure.

Section 6—System and Method for Auditing and Acting Upon Mobile and Internet Messaging, Location and Metadata.

The disclosed system provides a mechanism to audit SMS and MMS traffic as well as traditional messaging traffic such as instant messaging, and third-party social network communications.

As defined in Section 1, the system provides a mechanism to log SMS and MMS traffic as well as other relevant data from a mobile device.

As defined in Section 5, the system provides aggregation and logging of messaging traffic from multiple instant messaging and social networks.

Together this data is stored and accessible in a consolidated view.

The disclosed system provides a mechanism whereby users and administrators of the system may configure auditing of the stored communications using multiple criteria including, metadata, content, context, rate of activity, remote communicator identity, time, location, biometric, environmental and other variables.

The disclosed system may, based upon user or administrator configuration, alert systems, users, administrators of events observed by tracking variables within the logged content.

The system may employ multiple standards-based and proprietary methods for identifying patterns and relevance in text, images, audio and behavior patterns of the actors.

The system may alert users and administrators to relevant message data, context and activity the system observes during the course of operation including location and absence of activity or data acquisition by the services.

Figure 6:
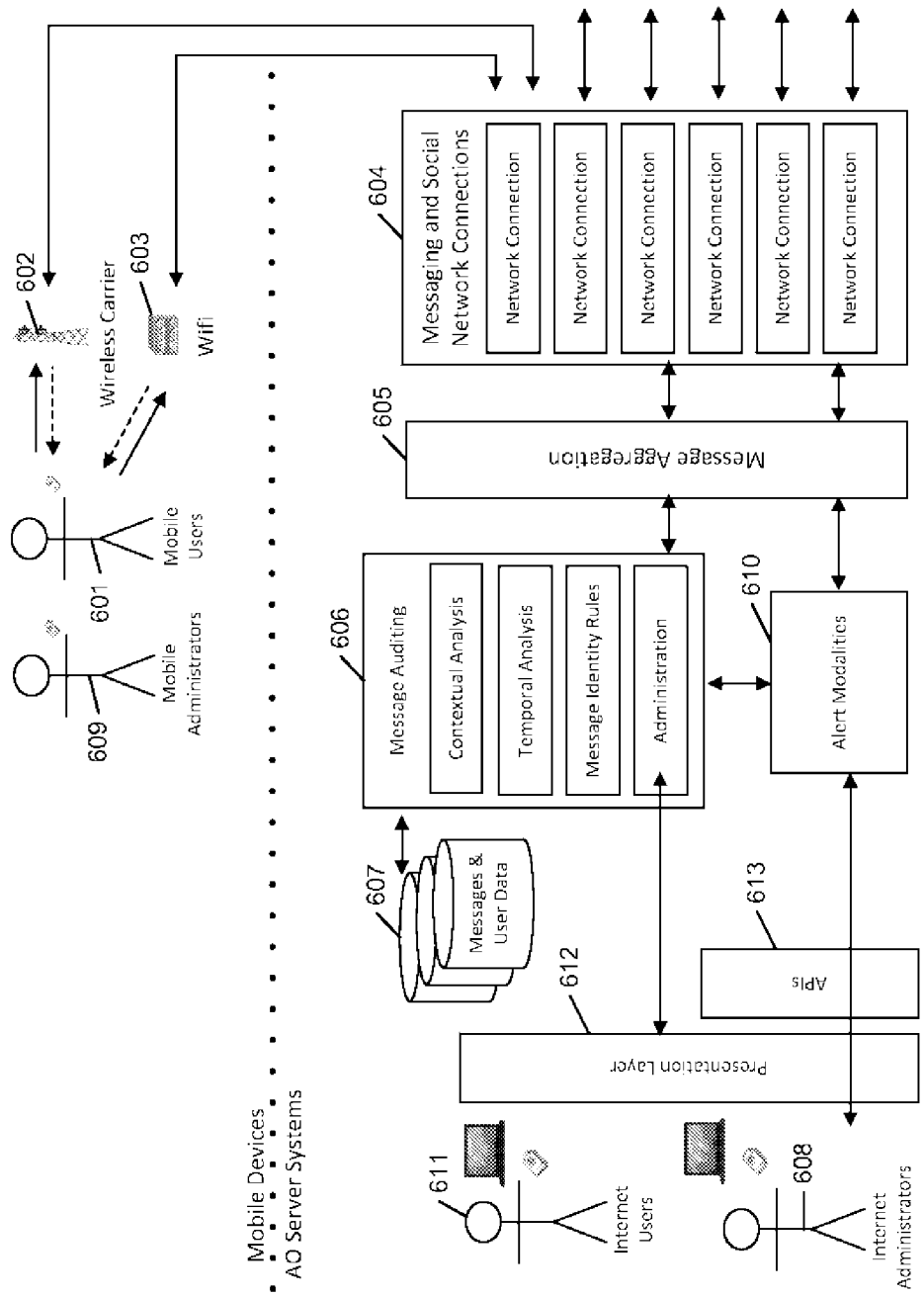
FIG. 6 illustrates an example system for auditing and acting upon mobile and/or Internet messaging.

FIG. 6 illustrates a mobile user 601 interacting with the system. Communications in the form of SMS and MMS are delivered to the central messaging system servers via wireless carrier 602 and will connection 603. Communications of multiple, different modalities are managed 604 (e.g., as described above with respect to FIG. 5) and aggregated 605 (e.g., as described above with respect to FIG. 5). After aggregation (or after receipt when aggregation is not performed and only a single type of message is being audit), the messages are processed (e.g., audited) for multiple criteria including context, temporal patterns, block or black lists 606. Results of the processing or auditing are stored in a database 607.

Alert criteria configured by the user or an administrator 608, 609 are applied to the processed data to identify matches. The criteria may relate to particular messaging activity, location or metadata and/or government regulations defined for messaging practices within an industry, thereby extending traditional logging, auditing and compliance functions as well as user location and activity to mobile devices in real-time.

Alerts are sent 610 to users 601, 611 and/or administrators 608, 609 and/or other systems in real-time based on the content and characteristics of the messaging, location and other data. Alerts may be sent to the user 611 and the administrator 608 via a presentation layer 612 or APIs 613.

Other messaging modalities are included in the data processing including instant messaging, email and social network communications. Auditing the aggregated messages together may offer increased efficiency and compliance with regulations because all messages are audited together at the same time.

FIG. 6 illustrates a single actor and single administrator for brevity. The system is designed for a carrier-scale actor-base where many more actors exchange messages.

Section 7—Method and System for Constructing Social Networks Using Real-Time Data from Wireless Devices.

The disclosed system performs a process for sending SMS. MMS. PIN and other standards-based and proprietary message types which are sent and received by mobile devices to a system for processing social network connections. The social network connections may be constructed without user input other than the communications (and other behavior) observed by the system.

The system performs a process for sending personal information management data, 'PIM' data to a system for processing social network connections.

The system performs a process for sending other mobile device data including system and device, performance and location data as well as other media, metadata and logs stored on the mobile device to a system for processing social network connections.

Connections are derived using source and destination unique identifiers in the mobile communications, contact or address book data from the mobile device as well as central processing which accesses internal and remote data stores from which relationships may be derived.

To the extent that resources are available, the social network is constructed in real time.

Figure 7:
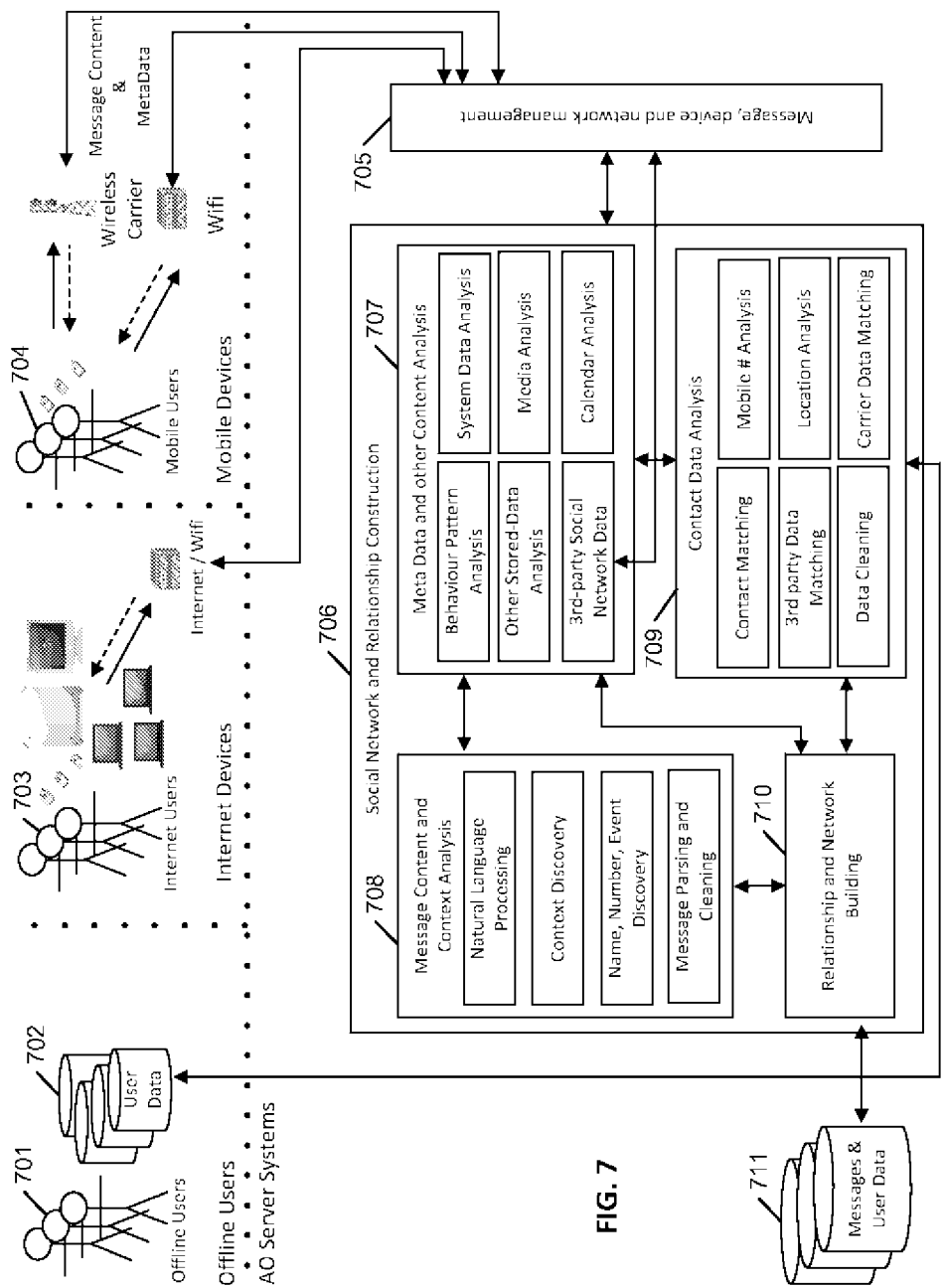
FIG. 7 illustrates an example system for constructing social networks.

FIG. 7 illustrates an example system for constructing social networks. A Social Network and Relationship Construction system 706 aggregates data from the devices (e.g., mobile devices) and comprises four primary system processes:
  1) Contact Data Analysis 709
  2) Message Content and Context Analysis 708
  3) Metadata and other (user and device data) Content Analysis 707
  4) Relationship and Network Building 710

Each of these processes is comprised of several sub-processes which perform discrete data processing tasks.
  1) Contact Data Analysis 709 encompasses processes primarily related to analysis of a user's current and past contact data set to derive explicit relationships and provide a dataset for inquiry into internal and external data stores.
     a. Contact data sent from mobile deices is first cleaned and prepared for system utilization. Contact data provided from Internet users of the system is included in this step.

b. Mobile numbers (e.g., mobile telephone numbers) are extracted as unique identifiers that can be utilized for internal data processing and for query of remote systems such as carrier data.

c. Contacts are derived from matches within existing datasets.

d. Assertions are made as to what constitutes relevant contact matches and fed to the Relationship processes.

2) Message Content and Context Analysis 708 encompasses processes primarily related to the content and context of messages that are sent to and from the mobile device including SMS, MMS and other text-based proprietary message formats which utilize the wireless carrier network or Internet connections for transport.

a. These messages are sent to a central system as they are sent or received and include the message content, device specific data and the related source or destination of the message and the related contact data.

b. Content data is processed using natural language processes to assist in determining the relationships of the contacts, events and context derived.

c. Names, phone numbers, events and other data are likewise discovered through parsing of message content in real time.

d. Data is then fed to the Relationship processes.

3) Metadata and other (user and device data) Content Analysis 707 is used to derive further relevant social relationships.

a. Contact data from derived contacts is utilized to query third-party social networks to build relationships.

b. Analysis of device PIM data is performed to derive further relationship data.

c. Analysis of other device system data, such as location, is performed to assist with relationship building in real time as a user changes locations.

d. Meta data from other data and media stored on the mobile device is analyzed for further relationship data.

e. Over-all behavior patterns involving the source or destination messaging and content are observed.

f. Data is then fed to the Relationship processes.

4) Relationship and Network Building 710 receives output from the primary data processing processes and assigns social and behavioral identifiers to users and user's relationships.

At any time the Relationship and Network Building 710 unit may query the sub units for additional data or order specific on or offline data processing tasks be carried out.

Likewise, the Relationship and Network Building 710 unit may request additional information from a specific mobile device and the method described in Section 3 is invoked (Mobile Device Interrogation). The Relationship and Network Building 710 unit may access data from message and user data store 711 and analyze the accessed data in performing relationship and network building (e.g., to account for historical message/user data). The Relationship and Network Building 710 unit also may store derived relationship and network data in the message and user data store 711.

FIG. 7 illustrates multiple mobile users 704 interacting with the system in the course of their normal SMS, MMS and other messaging communications.

The Mobile Client Extensions (MCE) on their mobile devices are delivering their mobile messaging, contact, device, meta and other media data to the server systems in real-time.

This data is analyzed by the Social Network and Content Analysis processes defined above.

Internet users' 703 content is included in this analysis. Communications and other activities of the Internet users 703 and the mobile users 704 are received by the message, device, and network management component 705 and passed to the social network and relationship construction system 706 for processing, as discussed throughout this disclosure.

Offline users 701 may be included in this analysis as well as the Social Network is discovered. User data stored in user data storage 702 may be accessed and used to include Offline users 701 in the analysis.

Social connections may be reported back to system users in real-time.

Likewise, event and interaction information may be presented to users in real-time based upon the content and context of their actual messaging in the course of normal device operation, without express request or interaction of the user.

Section 8—Method and System for Transferring Data from a Mobile Device in Increments.

This system performs a process for transferring large and small media, messages and content from mobile devices to a store without the requirement of first encoding the messages on the device and then sending the messages in fixed units. "chunks."

Currently, sending a media file from a mobile device involves encoding the media and sending the entire file. Encoding of media may take significant system resources and sending the entire file may utilize all available processing and wireless bandwidth. By sending raw data in chunks, minimal device processing is required and wireless bandwidth is used as-available so as not to interfere with core mobile communications or performance.

Figure 8:
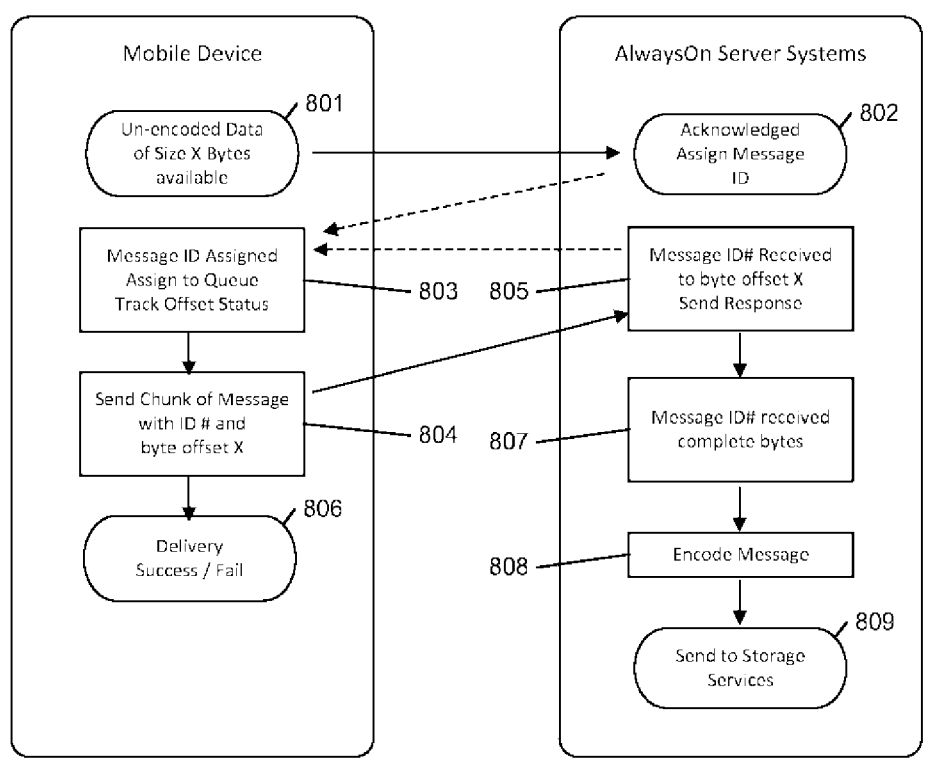
FIG. 8 illustrates an example of transferring data from a mobile device to a messaging system server.

FIG. 8 illustrates an example of transferring data from a mobile device to a messaging system server. In FIG. 8, a mobile actor receives or sends a media file or otherwise large file. It is determined by user settings or Remote Device Interrogation (defined in Section 3) that this media or file should be sent to a central data store. The mobile device identifies the file and calculates its size.

A message is sent to the server system which informs the system that a wireless device would like to send over a file or group of files N-bytes in site 801. It is not necessary that the mobile devices first encode or format the files to be transferred.

The server system replies to this mobile notification with an acknowledgement and a message identifier to be used in all future communications regarding this message 802.

The message is moved to a queue on the mobile device 803. The queue holds the file(s) until a Final success or failure determination is made.

A network processor identities the file(s) in the queue and manages the message identifier, file size and off-set of the last group of bytes sent to server. The network manager therefore manages the data-delivery status and information while the queue manages the files and messages to be sent and their priority.

As network connections are available, the network processor sends individual chunks to the server system 804. The message includes the original message identifier, the raw, binary data of the media and an offset indicator which informs the server system of up-to-what byte number of the originally referenced media size is being sent.

An order in which the messages are received by the server system does not matter, only that all of the messages are eventually received.

If a chunk is successfully received, the server system responds to the mobile device with a confirmation 805. If an error is encountered, the server system likewise responds to the mobile device 805.

If the mobile device experiences a problem sending, or otherwise receives an error for a given chunk, the message chunk is marked as failed 806.

The network processor on the device tracks which chunks have been successfully received and processes failures. It notifies the queue so that a determination may be made as to which items should be sent next. It also determines when a message should be abandoned and notifies the server if such a failure determination is made.

After receiving all of the chunks from the mobile device, the server system determines that all of the information has been received for the message with the associated identifier 807. In response to determining that all of the information has been received, the server system encodes the message 808 and sends the message to storage services 809 for storage and further processing as described throughout this disclosure.

Section 9—Method and System for Presenting Semantic Advertising on Mobile Devices and Internet Sites Based on SMS, MMS, PIN and Other Mobile Messaging Content and Remote Communications.

Figure 9:
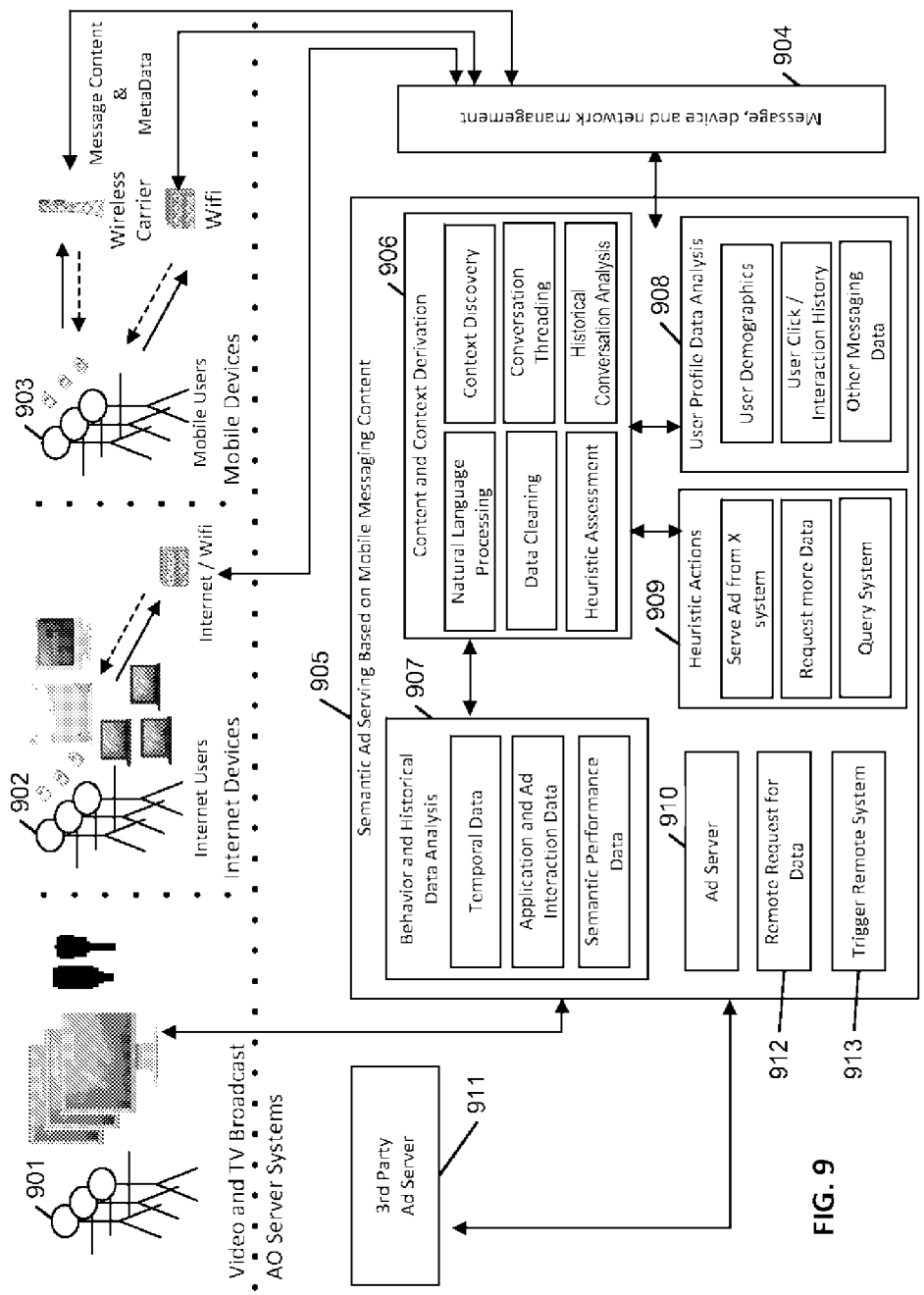
FIG. 9 illustrates an example system for semantic advertising.

FIG. 9 illustrates an example system that performs a process for analyzing all SMS, MMS, PIN and other mobile device messaging traffic to derive the context and semantics in order to determine what advertisements should be placed on both the mobile device and Internet sites.

The system performs a process for sending messaging from the mobile device to server systems for processing. The server system receives communications (and other data) from Internet users 902 and mobile users 903 through the message, device, and network management component 904, as described throughout this disclosure.

The system comprises a facility 905 for presenting the mobile user with a notification, coupon or other static or interactive advertising product based on the content, context and other metadata or parameters of their SMS, MMS, PIN and other standards-based and proprietary messaging to and from the mobile device.

The system performs a process for analyzing mobile messaging contacts that have been sent to the server system (as defined in Section 1 and Section 2) as part of the message meta data or related data relevant to the source or destination of the message content.

The system performs a process to incorporate semantics, behavior and demographics from multiple messaging modalities into its semantic assertions. Mobile, instant, and other personal messaging content, context, contact data and metadata may be used in these assertions. Social network data may be used in these assertions. Mobile carrier, cable, Internet, or satellite telecommunications and television provider data may be used in these assertions.

This data is then processed and assertions made about what internal or third-party advertising opportunities are relevant to the mobile user based upon several parameters including:

The characteristics of the remote interaction with the mobile user.
 The historical and current semantics of the interactions
 The historical and current context of the interactions
 The historical behavior of the user
 The locations of both the mobile user and the remote actor
 The social network connections, capabilities, preferences and other activities of the mobile user and the remote actors
 The history, identity and demographic data for the mobile user
 The history, identity and demographic data for the remote user The facility 905 may include several components that perform semantic advertising, as described above. For example, as shown in FIG. 9, the facility 905 may include a content and context derivation unit 906 that performs natural language processing, context discovery, data cleaning, conversation threading, heuristic assessment, and historical conversation analysis operations. The facility 905 also may include a behavior and historical data analysis unit 907 that analyzes temporal data, application and advertisement interaction data, and semantic performance data. The facility 905 further may include a user profile data analysis unit 908 that analyzes user demographics, user click/interaction history, and other messaging data. In addition, the facility 905 may include a heuristic actions unit 909 that may serve advertisements from a particular system, request more data, and query the system. The facility 905 determines which advertisements to serve to particular users based on a combination of output provided by the content and context derivation unit 906, the behavior and historical data analysis unit 907, the user profile data analysis unit 908, and the heuristic actions unit 909.

An ad server 910 may control presentation of relevant advertising identified by the facility 905. The advertising may be placed either on the mobile device for immediate viewing or delayed viewing based upon business requirements.

The advertising may appear on an Internet site that is accessed by mobile or wired devices utilizing the Internet as opposed to carrier-provided telecommunications networking.

The advertising may appear within a television or video broadcast (e.g., for perception by users 901) when integrated with a telecommunications, cable or satellite telecommunications provider such that advertising may be presented relevant to the semantics of the users' current messaging or details attic remote sender/recipient.

Aggregated and specific details of user behavior, content, context, history may be made available to a third-party system 911 from the ad server 910. This data will permit an alternate delivery mechanism to present advertising to the user based on the semantics of their mobile, instant, and other messaging.

The system may include a remote request unit 912 that may request additional information from a specific mobile device (or other device) and the method described in Section 3 is invoked (Mobile Device Interrogation). The system may include a trigger remote system unit 913 that triggers a remote system to perform an operation related to determining or presenting semantic advertising.

Section 10—Additional Information

In some implementations, as described throughout this disclosure, a system performs out-of-band SMS/MMS message logging, contact profile management, message aggregation over multiple modalities, communication auditing, social network building, connection management, and semantic advertising based on SMS/MMS messaging. The system may use any of the techniques described throughout this disclosure.

For instance, in performing out-of-band SMS: MMS message logging, SMS: MMS messaging traffic may be exchanged directly between user devices through a carrier network and also routed to the system through a separate communication for logging. The system receives the separate communication and logs and threads SMS/MMS traffic. Both placed messages and received messages are routed to the system without the actual communication traffic flowing through the system.

In managing contact profiles, the system may obtain contact profile information from user devices in bulk or iteratively when logging SMS/MMS message traffic. The system receives user contact information for a recipient/sender of an SMS/MMS message being logged and builds/updates a contact profile for that recipient/sender in the system based on the received user contact information. In some examples, a single user (e.g., User A) is a contact of multiple, different users (e.g., User 1 . . . User N). In these examples, each of the multiple users (e.g., User 1 . . . User N) may have a different contact profile for the single user (e.g., User A) that is based on the contact profile stored for the single user (e.g., User A) on the corresponding user's mobile device. The system also may use the contact profile information to assist in tracking other forms of communication with the contact. For instance, when the system does not have an IM address for a contact and the obtained contact profile from the user device includes an IM address for the contact, the system may use the obtained IM address to update the contact profile and, thereby, enable aggregation and threading of IMs exchanged with the contact.

In performing message aggregation over multiple modalities, the system may log and track all types of communications (e.g., SMS/MMS messages, telephone calls, instant messages, electronic mail messages, social networking interactions, etc.). The system may aggregate communications originated by a single user, but sent over multiple, different communication modalities and thread communications sent over the multiple communication modalities by the single into a single thread. For example, several messages exchanged over different communication mediums may be aggregated together and conversations with multiple, different users may be threaded together or separately based on the interactions.

In performing communication auditing, the system may audit (or enable auditing of) SMS/MMS messages in combination with other modalities. The system may identify which traffic is selected for auditing. For example, the system may identify messaging traffic associated with particular users (e.g., all users of a particular company) and select the identified messaging traffic for auditing. The system may generate auditing reports and alerts that leverage SMS/MMS messages, content, frequency, device activity, location, inactivity and device data acquisition characteristics among others.

In managing social networks, the system may build or update a social network through actual communications. The system may consider multiple modalities of communication and automatically build or update a social network based on interactions through the multiple modalities of communication. For instance, the system may identify actual social network connections and the strength of those connections by analyzing the number of communications exchanged between users, the timing of communications exchanged between users, and the types of communications exchanged between users, and weighting the interactions accordingly to identify connections and assess the strength of the connection. The system may maintain a unified list of contacts that is dynamically updated based on real time interactions and spans multiple, different communication modalities. The system may provide alerts to indicate that a change to a social network has been made or that prompt a user to accept a suggested change to a social network.

In performing connection management, the system may implement single sign-on and maintenance of connections. The system may perform single sign-on across multiple communication modalities and may maintain a persistent connection for a user even when an interface displayed by the system is closed by the user. The system also may leverage bots to provide intelligent handling of messages when the interface is closed. In some implementations, the system may automatically identify other communication services accessed by the user while using the system and automatically add the other communication services (and necessary login information) to the single sign-on list. For instance, the system may detect authentication to a supported service and automatically add to the supported service to the single sign-on list. The system may provide alerts to indicate that a change to the single sign-on list has been made or that prompt a user to accept a suggested change to the single sign-on list.

In performing semantic advertising based on SMS/MMS messaging, the system may analyze SMS/MMS messages to identify current interactions and personal characteristics and target advertising based on the identified current interactions and personal characteristics. For example, through real-time analysis of SMS/MMS messaging, the system may glean detailed information related to a user's current interactions. The system may use the detailed information related to the user's current interactions to provide highly specific advertising (or other content) that accounts for the user's current interactions.

In some examples, the system may be configured to track activities undertaken by children based on their mobile devices (e.g., smartphones). In these examples, the techniques described throughout this disclosure may be used to track location of children and/or communications (e.g., time and/or content of SMS or other messages). Parents may be able get access to the data for their children and the auditing processes described throughout may be used to notify parents of data drops, location drops, and other activities taken by the children that do not comply with one or more parental control rules set by the parents. In this regard, the parents may serve as the auditors and receive the alerts.

As described above, the techniques described throughout this disclosure may be used to perform social location-based services from user interaction with their applications and the server. The techniques perform the social location-based services without user interaction (e.g., without user check in). Accordingly, social location-based services may be enhanced as compared to systems that require user input/check in.

Metadata, when used throughout this disclosure, is intended to include data available from mobile devices which, when stored and processed with other data facilitate performance and accuracy of the service functions. Metadata are contemplated to include, but are not limited to: time, location, biometric data, device activity and user interaction data, environmental variables, specific device data, and data as may be available from the mobile device or from a device extension and may improve the services described. The techniques described throughout this disclosure may include analysis and processing of any combination of the items of metadata identified above.

In addition, the system and services described throughout this disclosure are contemplated to be made available in central or cloud capacity. Further, the system and services described throughout this disclosure may be offered in either a client-server model as defined with mobile clients interacting with a central or distributed service or may be installed within a telecommunications infrastructure such that messaging data is passed through the system for real-time evaluation without the requirement of mobile device-specific software.

Figure 10:
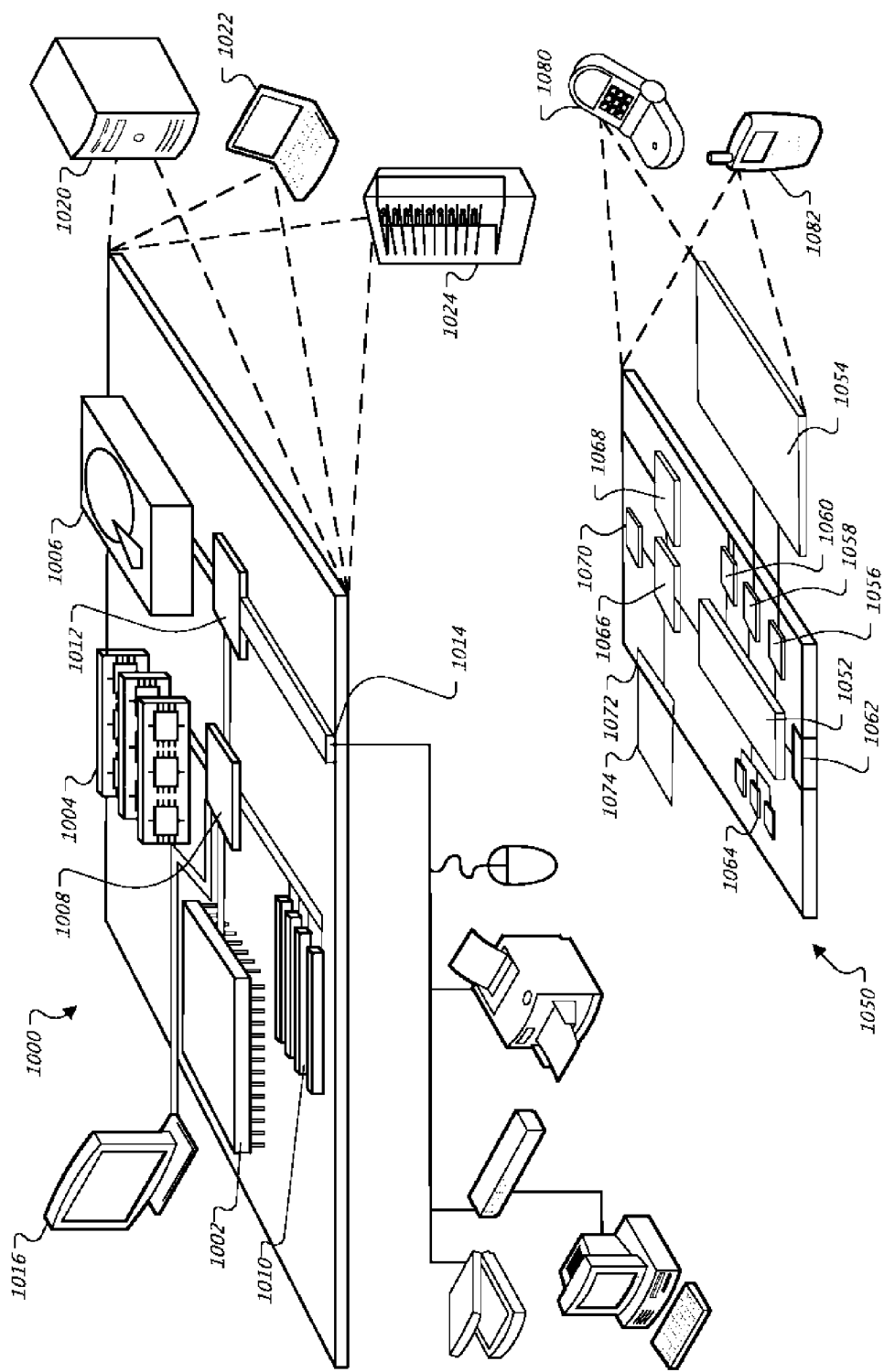
FIG. 10 illustrates an example computer system.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the approaches described in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 may process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple busses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In one implementation, the storage device 1006 is a computer-readable medium. In various different implementations, the storage device 1006 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of duties is exemplary only. In one implementation, the high-speed controller 1008 is coupled to memory 1004, display 1016 (e.g., through a graphics processor or accelerator), and to high-speed expansion ports 1010, which may accept various expansion cards. In this implementation, low-speed controller 1012 is coupled to storage device 1006 and low-speed expansion port 1014. The low-speed expansion port, which may include various communication ports (e.g., USB Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device, such as device 1050. Each of such devices may contain one or more of computing devices 1000, 1050, and an entire system may be made up of multiple computing devices 1000, 1050 communicating with each other. The computing device 1000 may include one or more sensors, such as gyroscopes, cameras or GPS (Global Positioning Satellite) trackers, configured to detect or sense motion or position of the computing device 1000.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various busses, and several of the components may be mounted on a common motherboard or in other manners as appropriate. The computing device 1050 may include one or more sensors, such as gyroscopes, cameras or GPS (Global Positioning Satellite) trackers, configured to detect or sense motion or position of the computing device 1050.

The processor 1052 may process instructions for execution within the computing device 1050, including instructions stored in the memory 1064. The processor may also include separate analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD display or an OLED display, or other appropriate display technology. The display interface 1056 may include appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication (e.g., via a docking procedure) or for wireless communication (e.g., via Bluetooth or other such technologies).

The memory 1064 stores information within the computing device 1050. In one implementation, the memory 1064 is a computer-readable medium. In one implementation, the memory 1064 is a volatile memory unit or units. In another implementation, the memory 1064 is a non-volatile memory unit or units. Expansion memory 1074 may also be provided and connected to device 1050 through expansion interface 1072, which may include, for example, a SIMM card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052.

Device 1050 may communicate wirelessly through communication interface 1066, which may include digital signal processing circuitry where necessary. Communication interface 1066 may provide for communications under various modes or protocols, such as GSM voice calls SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, or other such transceiver. In addition. UPS receiver module 1070 may provide additional wireless data to device 1050, which may be used as appropriate by applications running on device 1050. Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system comprising:
 a mobile device application that operates on a mobile device of a user and that is configured to obtain a message exchanged by the mobile device over a mobile device communication protocol; and
 a server that is remote from the mobile device, wherein the mobile device application is configured to forward, to the server, the obtained message over a network connection that does not use the mobile device communication protocol, the network connection being different than a traditional wireless signaling or delivery channel over which the message was exchanged, wherein the mobile device application is configured to access, from the mobile device, contact and contextual data relevant to the obtained message and forward, over the network connection to the server, the contact and contextual data with the obtained message, and wherein the server is configured to trigger operations related to deriving social network connections for the user based on receiving the obtained message and contact and contextual data, and is configured to, in response to triggering the operations related to deriving social network connections, derive, in real-time and without user intervention, one or more social network connections for the user based on the obtained message and other messages that have been forwarded to the server and that are associated with the user.

2. The system of claim 1, wherein the server is configured to receive, from the mobile device application over the network connection, the obtained message, log, in electronic storage, the obtained message, and make the logged message available to the user over the network connection using the mobile device or another device.

3. The system of claim 1, wherein the server is configured to perform a semantic advertisement service based on the obtained message and other mobile messaging content.

4. The system of claim 1, wherein the server is configured to interrogate the mobile device application for additional information relevant to social network connections for the user, receive the additional information from the mobile device application, and use the additional information in deriving social network connections for the user.

5. The system of claim 1, wherein the server is configured to notify the user of at least one new social network connection, event, or relationship derived, in real-time and without user intervention, based on the obtained message and other messages that have been forwarded to the server and that are associated with the user.

6. The system of claim 1, wherein the server is configured to construct a social network based on aggregated data received from mobile devices by performing contact data analysis on contact data aggregated by the server, performing message content and context analysis on message and context data aggregated by the server, performing metadata and other user or device content analysis on metadata and other user or device content aggregated by the server, and performing relationship and network building based on the contact data analysis, the message content and context analysis, and the metadata and other user or device content analysis.

7. The system of claim 1, wherein the server is configured to develop or evaluate and modify a contact list for the user by iteratively gathering contact data for contacts with which the user exchanges communications and aggregating the contact data into a contact list for the user based on actual interactions of the user and the contacts.

8. The system of claim 1:
wherein the mobile device application is configured to obtain a message sent or received by the mobile device over the mobile device communication protocol and is configured to forward the sent or received message over the network connection that does not use the mobile device communication protocol; and wherein the server is configured to receive, from the mobile device application over the network connection, the sent or received message, is configured to log, in electronic storage, the sent or received message, and is configured to make the sent or received message available to the user over the network connection using the mobile device or another device.

9. The system of claim 1:
wherein the mobile device application is configured to obtain a Short Message Service (SMS) message sent or received by the mobile device over an SMS transport protocol and is configured to forward the SMS message via Hypertext Transfer Protocol (HTTP) over Transmission Control Protocol and Internet Protocol (TCP/IP); and wherein the server is configured to receive, from the mobile device application via HTTP over TCP/IP, the SMS message, is configured to log, in electronic storage, the SMS message, and is configured to make the SMS message available to the user via HTTP over TCP/IP.

10. A server system, comprising:
at least one processor; and
at least one memory coupled to the at least one processor having stored thereon instructions which, when executed by the at least one processor, causes the at least one processor to perform operations comprising:
receiving, over a network connection, a message obtained by a mobile device application that operates on a mobile device of a user, the obtained message having been exchanged by the mobile device over a mobile device communication protocol and having been forwarded by the mobile device application over a network connection that does not use the mobile device communication protocol, the network connection being different than a traditional wireless signaling or delivery channel over which the message was sent or received;
receiving and aggregating contact data from user contacts with which the user exchanges communications; and
constructing a social network based on aggregated data received from mobile devices by performing analysis on the contact data aggregated by the server system, performing message content and context analysis on message and context data aggregated by the server system, performing metadata and other user or device content analysis on metadata and other user or device content aggregated by the server system, and performing relationship and network building based on the contact data analysis, the message content and context analysis, and the metadata and other user or device content analysis, wherein the social network is iteratively modified by aggregating the contact data into the social network based on actual interactions of the user and user contacts.

11. The system of claim 10, wherein the instructions further comprise:
logging, in electronic storage, the message received from the mobile device as a logged message; and
making the logged message available to the user over the network connection using the mobile device or another device.

12. The system of claim 10, wherein the instructions further comprise:
performing a semantic advertisement service based on the obtained message and other mobile messaging content.

13. A system comprising:
a mobile device application that operates on a mobile device of a user and that is configured to obtain a message exchanged by the mobile device over a mobile device communication protocol; and
a server that is remote from the mobile device,
wherein the mobile device application is configured to forward, to the server, the obtained message over a network connection that does not use the mobile device communication protocol, the network connection being different than a traditional wireless signaling or delivery channel over which the message was exchanged,
wherein the server is configured to audit the obtained message and other messages communicated by the user for compliance with one or more rules of a government or regulatory organization that govern communications engaged in by the user with the mobile device, parental control and monitoring or other activity and content approval, and
wherein the server is configured to trigger operations related to deriving social network connections for the user based on receiving the obtained message and contact and contextual data, and is configured to, in response to triggering the operations related to deriving social network connections, derive, in real-time and without user intervention, one or more social network connections for the user based on the obtained message and other messages that have been forwarded to the server and that are associated with the user.

14. The system of claim 13, wherein the server is configured to receive, from the mobile device application over the network connection, the obtained message, log, in electronic storage, the obtained message, and make the logged message available to the user over the network connection using the mobile device or another device.

15. The system of claim 13, wherein the server is configured to perform a semantic advertisement service based on the obtained message and other mobile messaging content.

\* \* \* \* \*